United States Patent
Gao et al.

(10) Patent No.: US 10,909,690 B2
(45) Date of Patent: Feb. 2, 2021

(54) DATA PROCESSING METHOD, APPARATUS, AND SYSTEM

(71) Applicant: SZ DJI TECHNOLOGY CO., LTD., Shenzhen (CN)

(72) Inventors: Mingming Gao, Shenzhen (CN); Kang Yang, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 138 days.

(21) Appl. No.: 16/211,978

(22) Filed: Dec. 6, 2018

(65) Prior Publication Data
US 2019/0114784 A1 Apr. 18, 2019

Related U.S. Application Data

(63) Continuation of application No. PCT/CN2016/085144, filed on Jun. 7, 2016.

(51) Int. Cl.
*G06T 7/207* (2017.01)
*G06T 7/269* (2017.01)

(52) U.S. Cl.
CPC .............. *G06T 7/207* (2017.01); *G06T 7/269* (2017.01); *G06T 2207/20016* (2013.01)

(58) Field of Classification Search
CPC .............. G06T 7/207; G06T 7/269; G06T 2207/20016
See application file for complete search history.

(56) References Cited

U.S. PATENT DOCUMENTS

| 5,617,459 A * | 4/1997 | Makram-Ebeid ..... G06T 7/0012 378/62 |
| 9,600,741 B1 * | 3/2017 | Su ........................... G06K 9/52 |
| 2012/0162228 A1 * | 6/2012 | Yamane ................ G06F 19/321 345/428 |
| 2013/0136234 A1 | 5/2013 | Noma et al. |
| 2014/0059272 A1 * | 2/2014 | Wang .................. G06F 12/0246 711/103 |

(Continued)

FOREIGN PATENT DOCUMENTS

| CN | 101060374 A | 10/2007 |
| CN | 101399977 A | 4/2009 |

(Continued)

OTHER PUBLICATIONS

The World Intellectual Property Organization (WIPO) International Search Report for PCT/CN2016/085144 dated Feb. 4, 2017 5 pages.

(Continued)

*Primary Examiner* — Santiago Garcia
(74) *Attorney, Agent, or Firm* — Anova Law Group, PLLC

(57) ABSTRACT

A data processing method includes reading first to-be-processed data from a first storage unit into a second storage unit, computing a processing result according to the first to-be-processed data stored in the second storage unit, and, while computing the processing result, reading second to-be-processed data from the first storage unit. The first to-be-processed data is at a first layer of one or more image pyramids having a plurality of layers, and the second to-be-processed data is at a second layer of the one or more image pyramids.

17 Claims, 9 Drawing Sheets

(56) References Cited

U.S. PATENT DOCUMENTS

| | | | | |
|---|---|---|---|---|
| 2014/0168473 A1* | 6/2014 | Hirai | ............... | H04N 9/77 348/231.99 |
| 2014/0226906 A1* | 8/2014 | Kang | ............... | G06K 9/6211 382/197 |
| 2015/0170333 A1* | 6/2015 | Jing | ............... | G06F 16/532 345/660 |
| 2016/0148359 A1* | 5/2016 | Gnedin | ............... | G06T 5/20 382/264 |

FOREIGN PATENT DOCUMENTS

| | | | |
|---|---|---|---|
| CN | 102509071 A | 6/2012 | |
| CN | 103177455 A | 6/2013 | |
| CN | 105205012 A | 12/2015 | |

OTHER PUBLICATIONS

Hengjian Liu et al., FPGA Implementation of Optical Flow in Pyramid Based on KLT Feature, Video Engineering, Dec. 31, 2014. p. 92-96. vol. 38, Issue 15. CN.

\* cited by examiner

Image I at the 0-th layer   Image I at the first layer   Image I at the second layer

DATA PROCESSING METHOD, APPARATUS, AND SYSTEM

CROSS-REFERENCE TO RELATED APPLICATION

This application is a continuation application of International Application No. PCT/CN2016/085144, filed on Jun. 7, 2016, the entire contents of which are incorporated herein by reference.

TECHNICAL FIELD

The present disclosure relates to the field of computer technologies and, in particular, to a data processing method, apparatus, and system.

BACKGROUND

With the development of computer technology, the use of image pyramids for data processing has been widely applied in many technical fields, especially in the fields of visual tracking and so on.

At present, when data processing is performed by using an image pyramid, the data processing process generally includes: a reading module reads the to-be-processed data at a layer of the image pyramid from an external memory; a computing module calculates the processing result according to the to-be-processed data at the present layer; and the reading module and the computing module continually repeat the above process until the entire data processing process is completed.

However, the above data processing process usually takes a long time, resulting in poor real-time performance.

SUMMARY

The technical problem to be solved by the embodiments of the present disclosure at least includes providing a data processing method, device, and system, that optimize the data processing process, thereby reducing time consumption and improving real-time performance.

Accordingly, the technical solutions to solve the technical problem of the present disclosure include the followings.

The present disclosure provides a data processing method. The method includes: reading first to-be-processed data from a first storage unit into a second storage unit, wherein the first to-be-processed data is at a first layer of one or more image pyramids having a plurality of layers; computing a processing result according to the first to-be-processed data stored in the second storage unit; and while computing the processing result, reading second to-be-processed data from the first storage unit, wherein the second to-be-processed data is at a second layer of the one or more image pyramids.

The present disclosure further provides a data processing apparatus. The data processing apparatus includes: a first storage unit and a second storage unit; a memory storing one or more computer programs; and a processor coupled to the memory and configured to execute the one or more computer programs to: read first to-be-processed data from the first storage unit into the second storage unit, wherein the first to-be-processed data is at a first layer of one or more image pyramids having a plurality of layers; compute a processing result according to the first to-be-processed data stored in the second storage unit; and while computing the processing result, read second to-be-processed data from the first storage unit, wherein the second to-be-processed data is at a second layer of the one or more image pyramids.

The present disclosure further provides a non-transitory computer-readable storage medium storing computer program instructions executable by at least one processor to perform: reading first to-be-processed data from a first storage unit into a second storage unit, wherein the first to-be-processed data is at a first layer of one or more image pyramids having a plurality of layers; computing a processing result according to the first to-be-processed data stored in the second storage unit; and while computing the processing result, reading second to-be-processed data from the first storage unit, wherein the second to-be-processed data is at a second layer of the one or more image pyramids.

According to the above technical solutions, when the data processing is conventionally performed by using an image pyramid, the processing time is often long due to long waiting time. In the embodiments of the present disclosure, it is not necessary to wait for the processing result at the present layer when using the image pyramid for data processing. Instead, when the processing result at the present layer is being calculated, the to-be-processed data at the next layer is started to be read to implement the calculation at the next layer. Thus, the data processing process is optimized, and the waiting time of the reading operation is reduced, thereby reducing time consumption and improving the real-time performance.

BRIEF DESCRIPTION OF THE DRAWINGS

In order to more clearly illustrate the technical solutions in the embodiments of the present disclosure, the drawings used in the description of the embodiments are briefly described below. It is obvious that the drawings in the description are only some embodiments of the present disclosure. Other drawings can also be obtained by those of ordinary skill in the art based on the disclosed drawings without creative efforts.

DETAILED DESCRIPTION OF THE EMBODIMENTS

Technical solutions of the present disclosure will be described with reference to the accompanying drawings. It will be appreciated that the described embodiments are some but not all the embodiments of the present disclosure. Other embodiments derived by those with ordinary skills in the art based on the described embodiments without inventive efforts should fall within the scope of the present disclosure.

Figure 1:
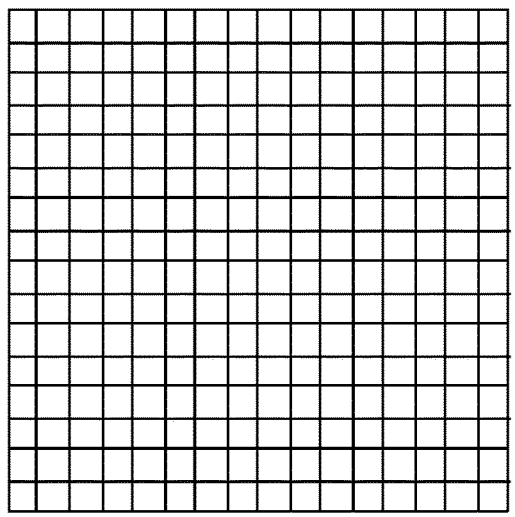
FIG. 1 is a schematic view of an image set of an image pyramid of three layers.
Figure 1:
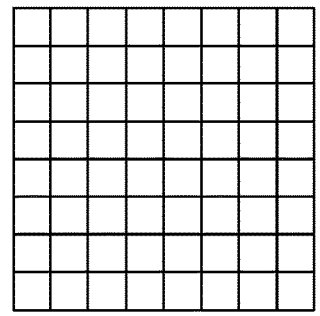
Figure 1:
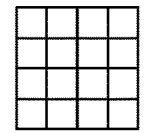

An image pyramid is a collection of images with decreasing resolution arranged in a pyramid shape. For example, FIG. 1 shows an image set of a 3-layer image pyramid of Image I. The image on the left is the image of the 0-th layer of the image pyramid of Image I; the image in the middle is the image of the first layer of the image pyramid of Image I; and the image on the right is the image of the second layer of the image pyramid of Image I. The types of image pyramids may include original pyramids, gradient pyramids, and so on. An original pyramid refers to an image pyramid representing the original features of the image, such as gray values and/or color values. The gradient pyramid is an image pyramid representing the gradient features of the original pyramid.

Image pyramids are widely used for data processing in the fields such as visual tracking. The KLT (Kanade-Lucas-Tomasi) algorithm is used as an example in the following description.

Figure 2:
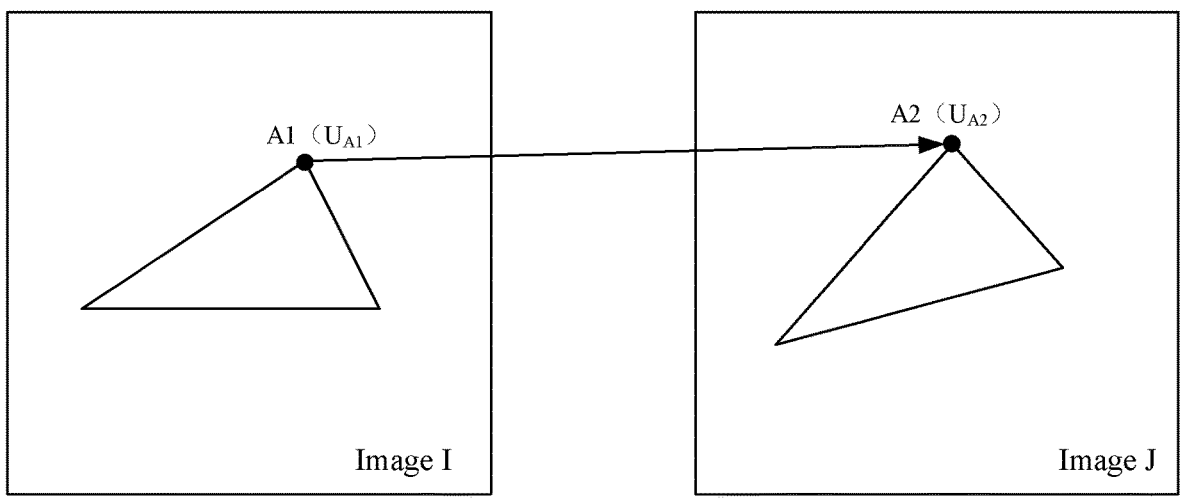
FIG. 2 shows the position points of the same tracking point in two images.

KLT algorithm is a commonly used tracking algorithm in the field of visual tracking. Due to characteristics such as anti-interference capabilities, the KLT algorithm has a wide range of applications. The KLT algorithm can be used to calculate the positional offset of one or more tracking points between at least two images. For example, FIG. 2 shows two images of Image I and Image J, in which the same tracking point is point A1 in Image I and point A2 in Image J. The KLT algorithm can be used to calculate the positional offset of the tracking point between Image I and Image J, that is, the positional offset between the position $U_{A1}$ of point A1 in Image I and the position $U_{A2}$ of the point A2 in Image J. The following describes the tracking process of the KLT algorithm.

An external memory stores the original pyramid $\{I^L\}$ and the gradient pyramid $\{I_A^L\}$ of Image I, and the original pyramid $\{J^L\}$ of Image J, wherein $L=0,1,L, L_m, L_m \geq 1$. First, the tracking method starts the reading process and computing process at the highest layer, i.e. at Layer $L_m$. A reading module reads the data within a tracking window of the original pyramid $\{I^L\}$ and the gradient pyramid $\{I_A^L\}$ at Layer $L_m$ from the external memory into an internal memory. For Image I, the size and the position of the tracking are constant. For example, the tracking window has a size 15×15, and centers on the tracking point's position in Image I. Next, the reading module reads data within the tracking window of the original pyramid $\{J^L\}$ at Layer $L_m$ into the internal memory. For Image J, the position of the tracking window is constantly adjusted. Next, a computing module calculates the offset correction $d^{L_m}$ of the tracking point at Layer $L_m$ and the predicted offset $g^{L_m-1}$ of the tracking point at Layer $L_m-1$ according to the data stored in the internal memory during the above reading process.

After completing the computing process at Layer $L_m$, according to the calculation result at the highest layer, the reading and computing processes at the next layer is performed until the reading and computing processes at the lowest layer is completed. According to the calculated offset correction $d^0$ and predicted offset $g^0$ at the lowest layer, the positional offset of the tracking point from Image I to Image J is calculated. By incorporating the position of the tracking point in Image I, the position of the tracking point in Image J may be further calculated.

In the process of visual tracking using KLT algorithm, it tends to take a long time which leads to poor real-time performance. The main reason is that the reading speed is much slower than the computing speed, so the process of reading data often accounts for most of the time of the tracking process, sometimes reaching 50%-75%. Therefore, the embodiments of the present disclosure provide a visual tracking method for optimizing the KLT algorithm, which can reduce the time consumed in the visual tracking process and provide real-time performance. The details are described below.

Figure 3:
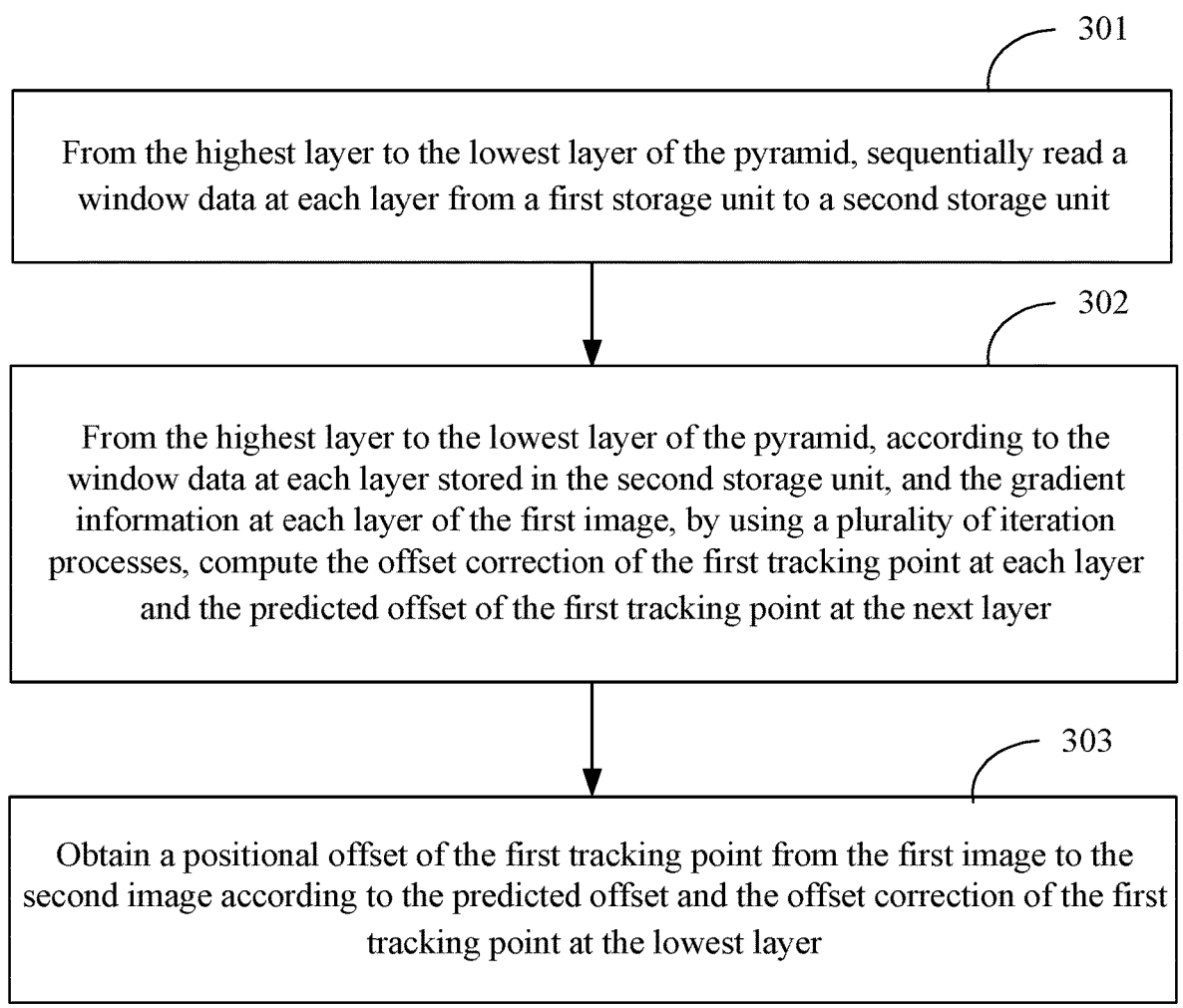
FIG. 3 is a flowchart of a method according to an embodiment of the present disclosure.

Referring to FIG. 3, the present disclosure provides a method for visual tracking. The visual tracking method of the present embodiment is for obtaining a positional shift of a first tracking point from a first image to a second image; wherein the first image has a first original pyramid, and the second image has a second original pyramid. For example, the first image and the second image may be Image I and Image J, respectively. The first original pyramid $\{I^L\}$ is the original pyramid of Image I, and the second original image pyramid $\{J^L\}$ is the original pyramid of Image J, where $L=0,1,L, L_m, L_m \geq 1$.

The visual tracking method of certain embodiments includes the followings.

301: From the highest layer to the lowest layer of the pyramid, sequentially reading window data at each layer from a first storage unit to a second storage unit.

The system may include at least two storage units, namely the first storage unit and the second storage unit. All the data of the first original pyramid and the second original pyramid are stored in the first storage unit. Both the first storage unit and the second storage unit refer to a module having a storage function, such as a memory, a buffer, and so on. The first storage unit may be an external storage unit, and the second storage unit may be an internal storage unit. After the window data is read from the first storage unit into the second storage unit, calculation at each layer may be performed according to the window data stored in the second storage unit.

The window data at any layer includes: data of the first original pyramid within a first tracking window at the present layer, and data of the second original pyramid within a second tracking window at the present layer, where the data within the second tracking window at the present layer includes all the data within the second tracking window of the second original pyramid that are used for iteratively computing the offset correction of the first tracking point at the present layer and the predicted offset at the next layer.

For example, Layer $L_m$'s window data includes: $I^{L_m}$'s data within the first tracking window and $J^{L_m}$'s data within the second tracking window, where $I^{L_m}$ is Layer $L_m$ of the original pyramid $\{I^L\}$, and $J^{L_m}$ is Layer $L_m$ of the second original pyramid.

302: From the highest layer to the lowest layer of the pyramid, according to the window data at each layer stored in the second storage unit, and the gradient information at each layer of the first image, by using a plurality of iteration processes, computing the offset correction of the first tracking point at each layer and the predicted offset of the first tracking point at the layer next to the present layer.

For example, at Layer $L_m$, according to the data of $I^{L_m}$ within the first tracking window and the data of $J^{L_m}$ within the second tracking window, by using a plurality of iteration processes, the offset correction $d^{L_m}$ at Layer $L_m$ and the predicted offset $g^{L_m-1}$ at Layer $L_m-1$, continue to compute the offset correction $d^{L_m-1}$ at Layer $L_m-1$ and the predicted offset $g^{L_m-2}$, at Layer $L_m-2$, until the offset correction $d^0$ and predicted offset $g^0$ at lowest layer, that is, the 0-th layer, are calculated.

303: Obtaining a positional offset of the first tracking point from the first image to the second image according to the predicted offset and the offset correction of the first tracking point at the lowest layer.

For example, by adding the offset correction $d^0$ and the predicted offset $g^0$ at the lowest layer, that is, the 0-th layer, the positional offset d of the first tracking point from the first image to the second image can be obtained, that is, $d=d^0+g^0$. By combining the first tracking point's position u in Image I, the first tracking point's position v in Image J can be further calculated. For example, first tracking point's position v in Image J can be computed as v=u+d.

In general, when reading data of the second original pyramid at any layer, at least K reading operations need to be performed to read K times. For example, at Layer $L_m$, during the first iteration process, the visual-tracking method reads data of the original pyramid $\{J^L\}$ within the third tracking window of the first iteration process at Layer $L_m$. During the second iteration process, the visual-tracking method reads data of the original pyramid $\{J^L\}$ within the third tracking window of the second iteration process at Layer $L_m$, and so on. In certain embodiments of the present disclosure, it is no longer necessary to read the data of the second original pyramid for K times. Instead, only one reading operation is needed for obtaining the data of the second original pyramid required in each iteration process at the present layer, that is, the data within the second tracking window. It is not necessary to issue multiple reading requests, thus reducing the time to send reading requests and to respond the reading requests. For example, the size of the third tracking window is 15 pixels×15 pixels, and the size of the second tracking window may be 33 pixels×33 pixels. Thereby, the reading process of the KLT tracking algorithm is optimized, the time consumption of the KLT tracking process is reduced, and the real-time performance is improved.

In certain embodiments of the present disclosure, the gradient information at each layer of the first image may be read from the gradient pyramid or may be computed according to the window data.

For example, the first image further has a gradient pyramid, for example, the gradient pyramid is Image I's gradient pyramid $\{I_A^L\}$. The first storage unit stores the gradient pyramid. The visual tracking method may further comprise: from the highest layer to the lowest layer of the pyramid, sequentially reading the data within the first tracking window of the gradient pyramid at each layer from the first storage unit into the second storage unit; wherein the gradient data at each layer of the first image includes: the data of the gradient pyramid within the first tracking window at each layer stored in the second storage unit.

In another example, the visual-tracking method may further comprise: computing gradient data at each layer of the first image according to data stored in the second storage unit of the first original pyramid within a first tracking window at each layer.

Figure 4:
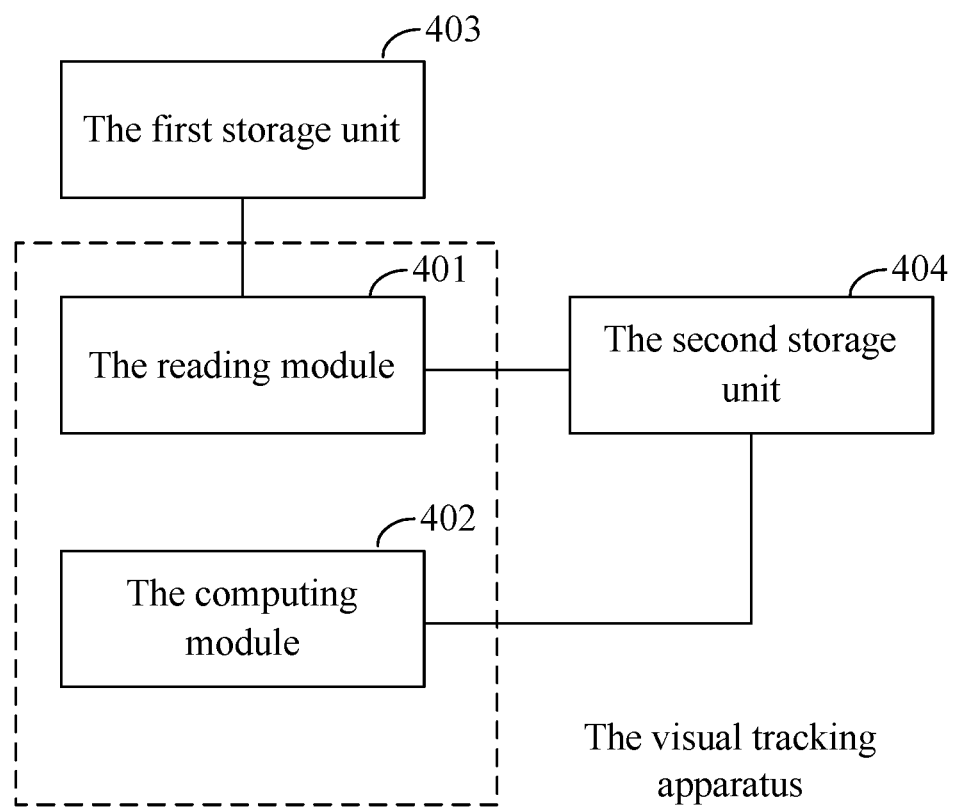
FIG. 4 is a schematic diagram of an apparatus according to an embodiment of the present disclosure.

Certain embodiments of the present disclosure may be specifically used in a visual tracking apparatus shown in FIG. 4. As shown in FIG. 4, the visual tracking apparatus comprises a reading module 401 and a computing module 402. The reading module 401 is connected to a first storage unit 403 and a second storage unit 404, respectively, and the computing module 402 is connected to the second storage unit 404. The reading operation in the embodiment is performed by the reading module 401, and the computing operation of the embodiment of the present disclosure is performed by the computing module 402. Moreover, the visual tracking apparatus may be used in a circuit having a parallel processing function, and the reading module 401 and the computing module 402 may have parallel processing functions. The circuit may include any of the following: a circuit having a multi-core processor, a parallel circuit system, and a digital logic circuit.

In certain embodiments, the position of the first tracking window at any layer is determined by the position of the first tracking point in the data of the first original pyramid. For example, the center of the first tracking window is at position $u^L$ at Layer L, where $u^L=u/2^L$. Here, u is the position of the first tracking point in the first image.

Since the location of the first tracking window is not related to the calculation result of the previous layer, the reading operation and the computing operation can be performed in parallel in certain embodiments of the present disclosure. When computing the offset correction at the present layer and the corrected offset at the next layer according to the window data at any layer, the data of the first original pyramid within the first tracking window at the next layer can start to be read, thereby further reducing time consumption. For example, when computing the calculation result at Layer $L_m$ according to the window data at Layer $L_m$, the reading module may start reading the window data at Layer $L_m-1$. In certain embodiments, after the window data at the present layer is read, reading may immediately start for the data of the first original image pyramid within the first tracking window at the next layer, and the present layer is simultaneously calculated, so that the reading operation can be continuously performed, resulting in saving time consumption. If the window data at any layer further includes data of the gradient pyramid within the first tracking window at the present layer, when the data of the gradient pyramid within the first tracking window at the present layer is calculated, the reading may also be started for the data of the gradient pyramid within the first tracking window at the layer next to the present layer.

If the reading of the data of the first original pyramid within the first tracking window at the layer next to the present layer is completed, and if the calculation result at the present layer is completed, that is, the offset correction at the present layer and the predicted offset at the next layer have been calculated, then the visual tracking apparatus continues to read the data of the second original pyramid within the second tracking window at the next layer. If the calculation result at the present layer is not completed, after waiting for completing the calculation result at the present layer, according to the calculation result at the present layer, the data of the second original pyramid within the second tracking window at the next layer is read.

Here, each iteration process may include: according to the result of the last iteration or the initial iteration parameters, the data of the first original pyramid within the first tracking window at the present layer, and the data of second original pyramid within the third tracking window of the present iteration at the present layer, calculating the result of the present iteration, wherein the position of the third tracking window of the iteration is determined according to the result of the last iteration or the initial iteration parameter. If the window data at any layer further includes data of the gradient pyramid within the first tracking window at the present layer, the result of the iteration is also calculated according to the gradient pyramid within the first tracking window at the present layer. The data within the second tracking window at the present layer may include: data within the third tracking window of the second original pyramid at the present layer of each iteration process.

For example, during the first iteration process at Layer $L_m$, according to the initial parameters $\bar{v}^0$, the data of $I^{Lm}$ in the first tracking window, the data of $I_A^{Lm}$ in the first tracking window, and the data of $J^{Lm}$ the third tracking window of the first iteration, computing the calculation result of the first iteration $\bar{v}^1$. In the second iteration process at Layer $L_m$, according to the calculation result of first iteration $\bar{v}^1$, the data of $I^{Lm}$ in the first tracking window, the data of $I_A^{Lm}$ in the first tracking window, and the data of $J^{Lm}$ in the third tracking window of the second iteration, computing the calculation result of the second iteration $\bar{v}^1$, and so on, until the result $\bar{v}^K$ of the K-th iteration is calculated. $\bar{v}^K$ is used as Layer $L_m$'s offset correction $d^{Lm}$. According to the offset correction $d^{Lm}$ and Layer $L_m$'s predicted offset $g^{Lm}$, calculate the predicted offset $g^{Lm-1}$ at Layer $L_m-1$. The initial iteration parameter can be set to $\bar{v}^0=[0\ 0]^T$, the Layer $L_m$'s predicted offset $g^{Lm}$ can be set to $g^{Lm}=[0\ 0]^T$. Data of $J^{Lm}$ in the second tracking window includes data of $J^{Lm}$ in the third tracking window of the K-th iteration.

Using $L_m$ as an example, a computing process is provided for the K-th iteration. The computing process does not limit the embodiment of the present disclosure.

$$\delta I_k(x,y) = I^{Lm}(x,y) - J^{Lm}(x+g_x^{Lm}+\bar{v}_x^{k-1}, y+g_y^{Lm}+\bar{v}_y^{k-1})$$

Here, $g_x^{Lm}$ and $g_y^{Lm}$ are $g^{Lm}$'s x-coordinate and y-coordinate, respectively. $\bar{v}_x^{k-1}$ and $\bar{v}_y^{k-1}$ are $\bar{v}^{k-1}$'s x-coordinate and y-coordinate, respectively. When $k>1$, $\bar{v}^{k-1}$ the result of the K-th iteration. When $k=1$, $\bar{v}^{k-1}$ is the initial iteration parameter.

$$\bar{b}_k = \sum_{x=p_x-w_x}^{p_x+w_x} \sum_{y=p_y-w_y}^{p_y+w_y} \begin{bmatrix} \delta I_k(x,y) I_x(x,y) \\ \delta I_k(x,y) I_y(x,y) \end{bmatrix}$$

Here, $P_x$ and $P_y$ are $U^{Lm}$'s x-coordinate and y-coordinate, respectively. $w_x$ and $w_y$ are determined cording to the first tracking window's side lengths on the x-axis and y-axis, respectively. $I_x(x,y)$ is the gradient pyramid $\{I_A^L\}$'s x-axis gradient pyramid at Layer $L_m$. $I_y(x,y)$ is the gradient pyramid $\{I_A^L\}$'s y-axis gradient pyramid at Layer $L_m$.

$$\bar{\eta}^k = G^{-1}\bar{b}_k$$

Here, G is the spatial gradient matrix at Layer $L_m$, and can be computed as:

$$G = \sum_{x=p_x-w_x}^{p_x+w_x} \sum_{y=p_y-w_y}^{p_y+w_y} \begin{bmatrix} I_x^2(x,y) & I_x(x,y)I_y(x,y) \\ I_x(x,y)I_y(x,y) & I_x^2(x,y) \end{bmatrix}$$

$$\bar{v}^k = \bar{v}^{k-1} + \bar{\eta}^k$$

Thus, Layer $L_m$'s K-th iteration result $\bar{v}^k$ is finally calculated. The iteration processes at other layers are similar to the above process, and will not be described here.

According to the above formula $J^{Lm}(x+g_x^{Lm}+\bar{v}_x^{k-1}, y+g_y^{Lm}+\bar{v}_y^{k-1})$, it can be seen that, the location of the second tracking window at any layer may be determined based on the location of the first tracking point at the present layer data of the first original pyramid, the predicted offset at the present layer, and the spatial gradient matrix at the present layer. Optionally, the spatial gradient matrix at the present layer is determined according to the gradient data at the present layer of the first image.

In certain embodiments of the present disclosure, the sequence of reading the window data at any layer may be: first reading the data of the first original pyramid within the first tracking window at the present layer, and then reading the data of the second original pyramid within the second tracking window at the present layer. Thus, there is no need for waiting to finish reading the data of the second original pyramid within the second tracking window at any layer. The calculation of the offset of the first tracking point at the present layer and the predicted offset at the layer next to the present layer can be started even before starting to read the data within the second tracking window. If the window data at any layer further includes data of the gradient pyramid within the first tracking window at the present layer, before reading the data of the second original pyramid, the reading may also be started for the data of the gradient pyramid within the first tracking window at the present layer.

For example, at Layer $L_m$, after reading $I^{Lm}$'s data within the first tracking window and $I_A^{Lm}$'s data within the first tracking window, computation can begin for Layer $L_m$, spatial gradient matrix G. After reading $J^{Lm}$'s data in the third tracking window during the first iteration, the computing module begins to perform the first iteration process. That is to say, the computing operation is started immediately after the data required for the calculation is obtained, and it is not necessary to wait for the data to be completely read.

In certain embodiments of the present disclosure, when it is required to calculate positional offsets of a plurality of tracking points from the first image to the second image, the above-mentioned visual tracking process needs to be repeated. Typically, the window data at each layer needs to be read again, and each time the layer's window data is determined based on the new tracking point. For example, if the positional offset of the first tracking point between Image I and Image J is to be computed, during the reading process at Layer $L_m$, typically a processing method only reads the image data of Image I and data of Image J within the tracking window. The position and size of the tracking window are determined according to the position of the first tracking point. However, if other tracking points are calculated, such as the positional offset of a second tracking point is calculated, during the reading at Layer $L_m$, the data of Image I and data of Image J within the tracking window need to be read again, and the position and size of the tracking window are determined according to the position of the second tracking point. During this type of processes that require iterative processing, the to-be-processed data needs to be read with multiple reading operations, resulting in long time consumption and poor real-time performance.

Thus, in certain embodiments of the present disclosure, one or more layers of data at the top of the image pyramid can be read at once, which can solve the above technical problem. Furthermore, the data size at the top of the image pyramids is usually small, and does not occupy excessive storage space. Specifically, the data processing method in certain embodiments of the present disclosure may further include: when reading data within the tracking window of one or more image pyramids at one or more top layers, further reading the remaining data of the one or more image pyramid at the one or more top layers; obtaining a positional offset of the second tracking point from the first image to the second image according to the remaining data; wherein the one or more image pyramids comprising: the first original pyramid, and one or more of the second original pyramids. Optionally, the one or more image pyramids may further include the gradient pyramid.

For example, in 301, the mothed reads all the data of $I^{Lm}$ at Layer $L_m$ into the second storage unit. At this time, both the window data at Layer $L_m$ and the remaining data at Layer $L_m$ is read. After that, when computing the positional offset of the second tracking point, it is not necessary to re-read the data of $I^{L_m}$ at Layer $L_m$. Instead, the remaining data is used to calculate the positional offset of the second tracking point from the first image to the second image, reducing the number of reading operations, thereby reducing time consumption. For the specific computing process of computing the positional offset of the second tracking point, refer to the computing process of computing the positional offset of the first tracking point, which will not be described here again.

Similar to the tracking process of the above KLT algorithm, when data processing is performed by using an image pyramid, a data processing process generally includes: a reading module reads the to-be-processed data of the image pyramid at a layer from an external memory; a computing module calculates the processing result according to the to-be-processed data at the present layer; and the reading module and the computing module continually repeat the above process until the entire data processing process is completed.

In the above data processing process, after reading to-be-processed data at a specific layer, the reading module often waits for the computing module to complete the calculation before reading the to-be-processed data at the next layer, resulting in long time consumption and poor real-time performance. Especially in the tracking process of KLT tracking algorithm, since the reading speed is much slower than the computing speed, the process of reading data often accounts for most of the tracking process, and can even account for 50%-75% of the entire tracking process.

The embodiments of the present disclosure provide a data processing method, device, and system, which optimize the data processing process, thereby reducing time consumption and improving real-time performance.

Figure 5:
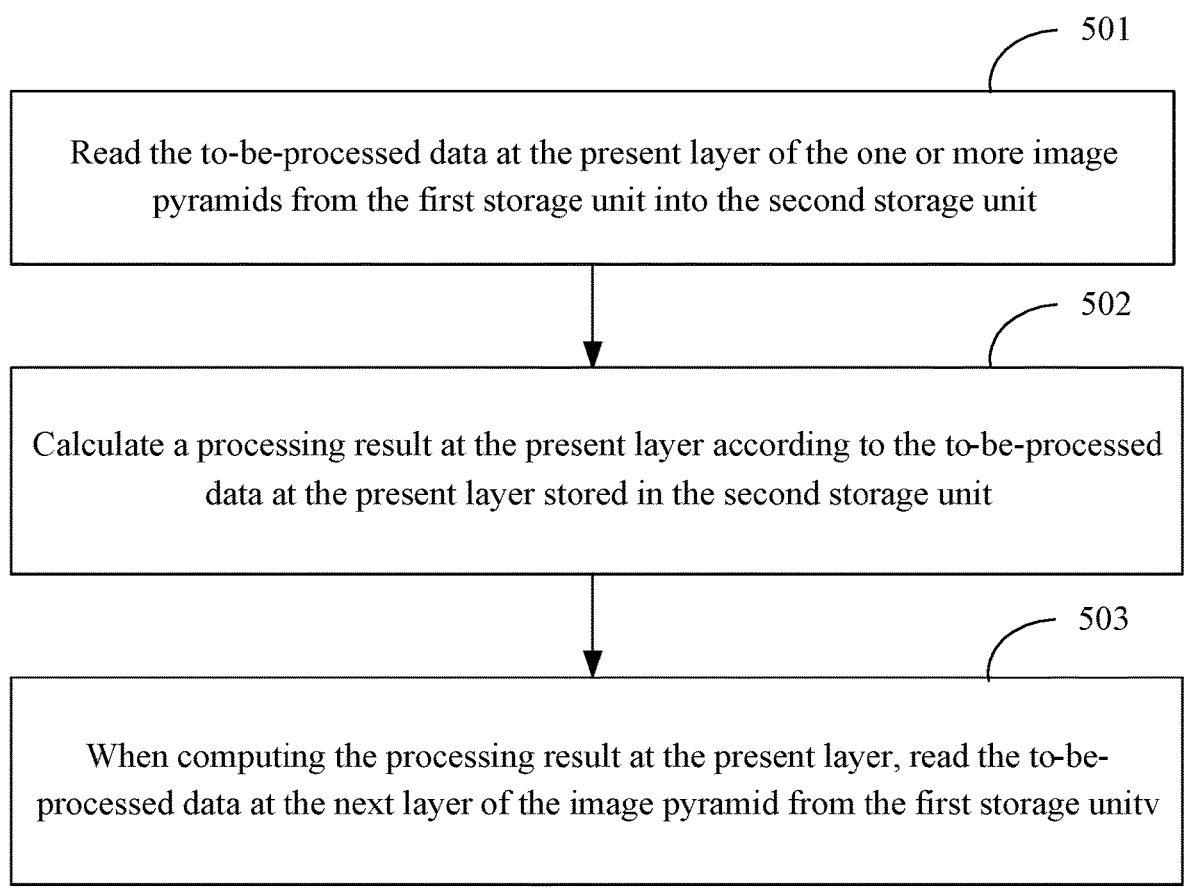
FIG. 5 is a flowchart of another method according to an embodiment of the present disclosure.

Referring to FIG. 5, a data processing method is provided. The data processing method may include the followings.

501: Reading the to-be-processed data at the present layer of the one or more image pyramids from the first storage unit into the second storage unit.

The system used in this embodiment includes at least two storage units, namely the first storage unit and the second storage unit. The to-be-processed data at the present layer of one or more image pyramids is stored in the first storage unit. In fact, the first storage unit typically stores the entire layer of data at the present layer of the one or more image pyramids. For example, in the KLT algorithm, when the present layer is Layer $L_m$, the first storage unit stores all the data of the image pyramid of Image I ((for example, the original pyramid $\{I^L\}$) at Layer $L_m$, as well as all the data of the image pyramid of Image J (for example, the original pyramid $\{J^L\}$) at Layer $L_m$.

The to-be-processed data at the present layer refers to data used to compute the processing result at the present layer among all the data at the present layer. For example, in the KLT algorithm, when the present layer is Layer $L_m$, the to-be-processed data of the original image pyramid $\{I^L\}$ of Image I at the present layer includes the data of the original image pyramid $\{I^L\}$ of Image I within the first tracking window at Layer $L_m$.

502: Calculating a processing result at the present layer according to the to-be-processed data at the present layer stored in the second storage unit.

In certain embodiments of the present disclosure, the first storage unit and the second storage unit refer to a module having a storage function, such as a memory, a buffer, and so on.

The first storage unit may be an external storage unit, and the second storage unit may be an internal storage unit. After the to-be-processed data is read from the first storage unit into the second storage unit, the processing result at the present layer may be computed according to the to-be-processed data stored in the second storage unit. For example, in the KLT algorithm, when the present layer is Layer $L_m$, according to the to-be-processed data at the present layer stored in the second storage unit, the data processing method may calculate the tracking point's offset correction $d^{L_m}$ at Layer $L_m$ and the predicted offset $g^{L_m-1}$ at Layer $L_m-1$.

503: When computing the processing result at the present layer, reading the to-be-processed data at the next layer of the image pyramid from the first storage unit.

In certain embodiments of the present disclosure, the reading function and the computing function are performed in parallel. It is not necessary to wait for the processing result at the present layer to be computed.

Instead, when computing the processing result at the present layer, the data processing method may start to read the to-be-processed data at the next layer, so calculation can be performed at the next layer. For example, in the KLT algorithm, when the present layer is Layer $L_m$, when computing the tracking point's offset correction $d^{L_m}$ at Layer $L_m$ and the predicted offset $g^{L_m-1}$ at Layer $L_m-1$, the data processing method may start to read the to-be-processed data at Layer $L_m-1$.

According to the above technical solution, when the data processing is performed by using image pyramids, the processing time is typically long due to long waiting time. Therefore, in the embodiments of the present disclosure, it is not necessary to wait for the processing result at the present layer when using the image pyramids. Instead, when the processing result at the present layer is being calculated, the to-be-processed data at the next layer is read, so calculation can be performed at the next layer. Thus, the data processing process is optimized, and the waiting time of the reading operation is reduced, thereby reducing time consumption and improving the real-time performance.

Figure 6:
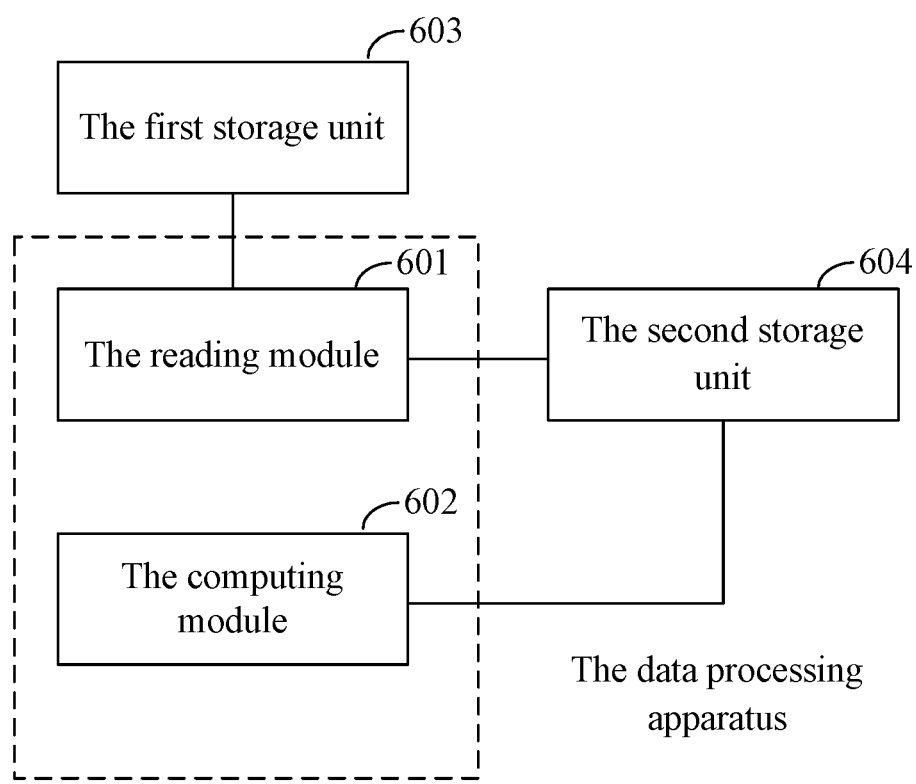
FIG. 6 is a schematic diagram of another apparatus according to an embodiment of the present disclosure.

The embodiments of the present disclosure may be specifically used in the data processing apparatus shown in FIG. 6. As shown in FIG. 6, the data processing apparatus includes a reading module 601 and a computing module 602. The reading module 601 is connected to the first storage unit 603 and the second storage unit 604, respectively, and the computing module 602 is connected to the second storage unit 604. The reading operation is performed by the reading module 601, and the computing operation is performed by the computing module 602. Also, the data processing apparatus may be used in a circuit having a parallel processing function, and the reading module 601 and the computing module 602 may have parallel processing functions. The circuit may include any of the following: a circuit having a multi-core processor, a parallel circuit system, and a digital logic circuit.

When computing the processing result at the present layer according to the to-be-processed data at the present layer, certain embodiments of the present disclosure may be implemented by multiple iteration processes. Specifically, 502 includes: computing the processing result at the present layer by using a plurality of iteration processes according to the to-be-processed data at the present layer stored in the second storage unit. However, since the data required during an iteration process is typically determined by the iterative result of the last iteration, it results in the need to cyclically read data during the present layer calculation, and for every reading operation, it needs to send a reading request and wait for the response to the reading request, resulting in increased time consumption of the reading operation, thereby causing the data processing take a long time.

For example, when the KLT algorithm performs visual tracking, during the first iteration process at Layer $L_m$, the data processing method reads the data of the original pyramid $\{I^L\}$ within the first tracking window at Layer $L_m$ and the data of the original pyramid $\{J^L\}$ within the third tracking window at Layer $L_m$. According to the data that has been read, the data processing method calculates the iteration result $\bar{v}^1$ of the first iteration process. The iteration result $\bar{v}^1$ will affect the third tracking window's position in the next iteration process, therefore, during the second iteration process, it is needed to re-read the data of the original pyramid $\{J^L\}$ within the third tracking window at Layer $L_m$ during the second iteration process. In the computing process at one layer of a pyramid, the data of the original pyramid $\{I^L\}$ needs to be read for at least one time. The data of the original pyramid $\{J^L\}$ needs to be read for at least K times, where K is the total number of iterations at the present layer. Since the reading speed is much slower than the calculation speed, the process of reading data often accounts for most of the tracking process, and can even account for 50%-75% of the entire tracking process.

To solve this problem, in certain embodiments of the present disclosure, the data used in every iteration can be read into the second processing unit at a single time, that is, by one reading operation (sending one request). All of the data used in every iteration is read into the second processing unit, so that multiple cyclic reading operations are not required. Specifically, step 501 may include: reading, from the first storage unit, the to-be-processed data at the present layer of the one or more image pyramids into the second processing unit; where the to-be-processed data at the present layer of the one or more image pyramids include data used in all iterations at the present layer of the one or more image pyramids.

Still using the KLT algorithm as an example, during the reading process at Layer $L_m$, in addition to reading the data of the original pyramid $\{I^L\}$ in the first tracking window at Layer $L_m$, also read the data of the original pyramid $\{J^L\}$ in the second tracking window at Layer $L_m$ in a single reading operation. The data in the second tracking window includes the data that is used for the K iterations of the original pyramid $\{J^L\}$ at Layer $L_m$. For example, the size of the first tracking window is 15 pixels×15 pixels, and the size of the second tracking window may be 33 pixels×33 pixels. Therefore, in the computing process of one layer of a pyramid, the data of the original pyramid $\{I^L\}$ needs to be read for one time, and the data of the original pyramid $\{J^L\}$ needs to be read for one time, thereby reducing time consumption and improving the real-time performance.

Before completing the reading operation, as long as the data needed in the first iteration process has been read, the computing process can be started for the present layer. Specifically, compute the processing result at the present layer by using a plurality of iteration processes, which includes starting to compute the processing result at the present layer by using a plurality of iteration processes before completing the reading process of the to-be-process data at the present layer. For example, in the KLT algorithm, during the reading and computing processes at Layer $L_m$, after reading the data of the original pyramid $\{I^L\}$ in the first tracking window at Layer $L_m$, before completing reading all the data of the original pyramid $\{J^L\}$ in the second tracking window at Layer $L_m$, as long as the data of the original pyramid $\{J^L\}$ in the third tracking window at Layer $L_m$ for the first iteration process has been read, the data processing method may start the first iteration process, and continue to read the remaining data in the second tracking window.

In certain embodiments of the present disclosure, the one or more image pyramids may include a first image pyramid and a second image pyramid. When the to-be-processed data at the next layer of the first image pyramid is read, the processing result at the present layer does not need to be used. Therefore, when computing the processing result at the present layer, reading the to-be-processed data at the next layer of the first image pyramid from the first storage unit can be started. After computing the processing result at the present layer, according to the processing result, the data processing method may start reading the to-be-processed data of the second image pyramid at the next layer from the first storage unit.

Optionally, the to-be-processed data at the next layer includes data of the first image pyramid within the first tracking window at the next layer, and data of the second image pyramid within the second tracking window at the next layer. The position of the second tracking window at the next layer is determined according to the processing result at the present layer.

Optionally, the first image pyramid includes a first original pyramid of the first image, for example, an original pyramid $\{I^L\}$ of Image I; the second image pyramid includes a second original pyramid of the second image, such as the original pyramid $\{J^L\}$ of Image J. The to-be-processed data at any layer includes: data of the first original pyramid within a first tracking window at the present layer, and data of the second original pyramid within a second tracking window at the present layer. The position of the first tracking window is determined according to the position of the tracking point in the data at the present layer of the first original pyramid. The position of the second tracking window at the present layer is determined according to the processing result at layer previous to the present layer. Computing the processing result at the present layer according to the to-be-processed data at the present layer stored in the second storage unit includes: according to the to-be-processed data at the present layer stored in the second storage unit, and the gradient data of the first image at the present layer, computing the processing result at the present layer.

Optionally, the first image further has a gradient pyramid. The data processing method further comprises: reading the data within the first tracking window of the gradient pyramid at the present layer from the first storage unit into the second storage unit; wherein the gradient data at the present layer of the first image includes: the data of the gradient pyramid within the first tracking window at the present layer stored in the second storage unit.

Optionally, the data processing method further includes: computing gradient data at the present layer of the first image pyramid according to data stored in the second storage unit of the first original pyramid within the first tracking window at the present layer.

Optionally, the data within the second tracking window at any layer includes: data used during every iteration for the second original pyramid at the present layer.

Optionally, the processing result at any layer includes: the offset correction of the tracking point at the present layer and a predicted offset at the layer next to the present layer. Further, a positional offset of the tracking point from the first image to the second image may be obtained according to the offset correction and the predicted offset of the tracking point at the lowest layer. For example, based on the offset correction $d^0$ and the predicted offset $g^0$ at the lowest layer, the positional offset of the tracking point from Image I to Image J can be calculated. By incorporating the position of the tracking point in Image I, the position of the tracking point in Image J may be further calculated.

In the process of data processing using image pyramids, if the to-be-processed data at the present layer of one of the image pyramids is read at a single time, usually one waits for the data to be completely read before starting processing, which is often time-consuming due to the long waiting time. In fact, in certain embodiments of the present disclosure, it is not necessary to wait for the data to be completely read before starting to compute the processing result at the present layer. Instead, the calculation can be started before the reading is completed, thereby further optimizing the data processing process, reducing time consumption, and improving real-time performance.

Still using the KLT algorithm as an example, during the reading process at Layer $L_m$, in addition to reading the data of the original pyramid $\{I^L\}$ and $\{I_A{}^L\}$ within the first tracking window at Layer $L_m$, also read the data of the original pyramid $\{J^L\}$ within the second tracking window at Layer $L_m$ in a single reading operation. Before completing reading the data in the second tracking window, as long as the data of the original pyramid $\{J^L\}$ in the third tracking window at Layer $L_m$ for the first iteration process has been read, the data processing method may start the first iteration process, and continue to read the remaining data in the second tracking window.

Figure 7:
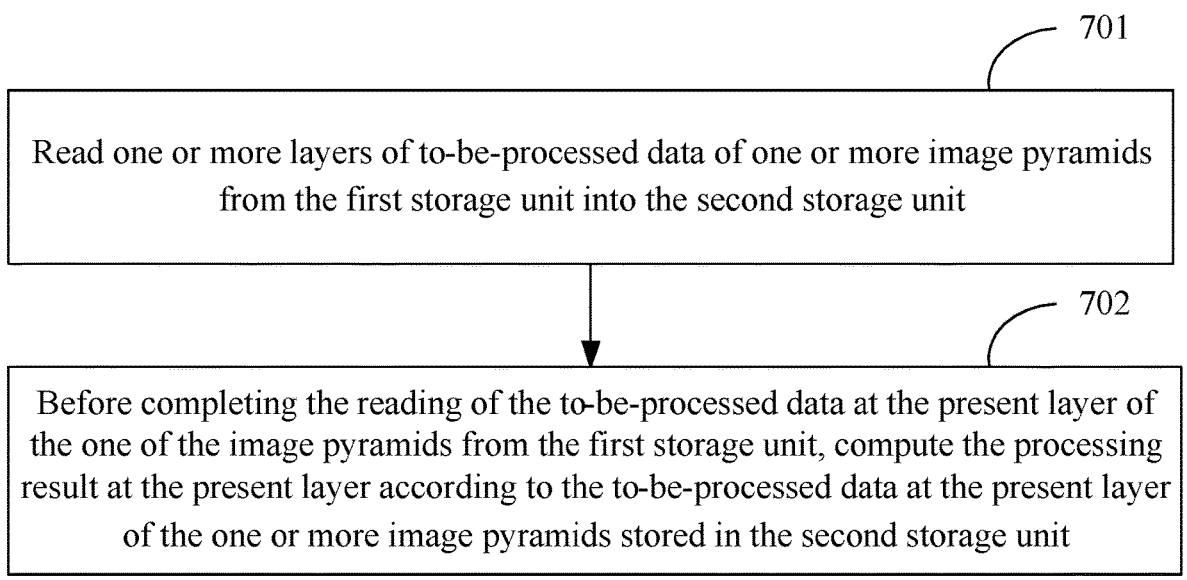
FIG. 7 is a flowchart of another method according to an embodiment of the present disclosure.

Referring to FIG. 7, the present disclosure provides another data processing method. The data processing method include the followings.

701: Reading one or more layers of to-be-processed data of one or more image pyramids from the first storage unit into the second storage unit.

The system used in certain embodiments includes at least two storage units, namely the first storage unit and the second storage unit. The to-be-processed data of one image pyramid at one or more layers, or the to-be-processed data of multiple image pyramid at one or more layers, is stored in the first storage unit. In fact, the first storage unit typically stores the entire layers of one or more layers of data of the one or more image pyramids. For example, in the KLT algorithm, the first storage unit stores all the data of an image pyramid of Image I ((for example, the original pyramid $\{I^L\}$) at one or more layers, as well as all the data of the image pyramid of Image J (for example, the original pyramid $\{J^L\}$) at one or more layers.

The to-be-processed data at one or more layer refers to data used to compute the processing result at one or more layers among all the data at the one or more layers. For example, in the KLT algorithm, for Layer $L_m$, the to-be-processed data of the original image pyramid $\{I^L\}$ of Image I at the present layer includes the data of the original image pyramid $\{I^L\}$ of Image I within the first tracking window at Layer $L_m$.

In certain embodiments of the present disclosure, in step 701, when the to-be-processed data at the present layer of one of image pyramids is being read, the data is read from the first storage unit into the second storage unit at once. That is, by one reading operation, the to-be-processed data at the present layer of one of the image pyramids is read from the first storage unit into the second storage unit. For example, in the KLT algorithm, during the reading process at Layer $L_m$, read the data of the original pyramid $\{J^L\}$ within the second tracking window at Layer $L_m$ in a single reading operation. The data in the second tracking window includes the data that is used for the K iterations of the original pyramid $\{J^L\}$ at Layer $L_m$.

In certain embodiments of the present disclosure, both the first storage unit and the second storage unit refer to a module having a storage function, such as a memory, a buffer, and so on. The first storage unit may be an external storage unit, and the second storage unit may be an internal storage unit. After the to-be-processed data is read from the first storage unit into the second storage unit, calculation at the present layer may be performed according to the to-be-processed data stored in the second storage unit.

702: Before completing the reading of the to-be-processed data at the present layer of the one of the image pyramids from the first storage unit, computing the processing result at the present layer according to the to-be-processed data at the present layer of the one or more image pyramids stored in the second storage unit.

In certain embodiments of the present disclosure, when reading the to-be-processed data at the present layer of one of the image pyramids, it is not necessary to wait for the data to be completely read before starting to compute the processing result at the present layer. Instead, the calculation for the present layer can be started before the reading the data of an image pyramid at the present layer is completed, as long as enough data has been read that can satisfy starting the calculation.

According to the above technical solution, in the process of data processing using the image pyramid, if the to-be-processed data at the present layer of one of the image pyramids is read at a single time, usually one waits for the data to be completely read before starting processing the data, which is often time-consuming due to the long waiting time. In fact, in certain embodiments of the present disclosure, it is not necessary to wait for the data to be completely read before starting to compute the processing result at the present layer. Instead, the calculation can be started before the reading is completed, thereby further optimizing the data processing process, reducing time consumption, and improving real-time performance.

The embodiment of the present disclosure may be specifically used in the data processing apparatus shown in FIG. 6. As shown in FIG. 6, the data processing apparatus includes a reading module 601 and a computing module 602. The reading module 601 is connected to the first storage unit 603 and the second storage unit 604, respectively, and the computing module 602 is connected to the second storage unit 604. The reading operation is performed by the reading module 601, and the computing operation of the embodiment of the present disclosure is performed by the computing module 602. Also, the data processing apparatus can be used in a circuit having a parallel processing function, and the reading module 601 and the computing module 602 have parallel processing functions. The circuit can include any of the following: a circuit having a multi-core processor, a parallel circuit system, and a digital logic circuit.

When computing the processing result at the present layer according to the to-be-processed data at the present layer, certain embodiments of the present disclosure may be implemented with multiple iteration processes. Specifically, in 702, computing the processing result at the present layer according to the to-be-processed data at the present layer of the one or more image pyramids stored in the second storage unit includes: starting computing the processing result at the present layer by using a plurality of iteration processes according to the to-be-processed data at the present layer of the one or more image pyramids stored in the second storage unit.

When the data required for the first iteration is read, it is possible to start computing the processing result at the present layer. Take the KLT algorithm as an example, during the reading and computing processes at Layer $L_m$, after reading the data of the original pyramid $\{I^L\}$ in the first tracking window at Layer $L_m$, before completing reading all the data of the original pyramid $\{J^L\}$ within the second tracking window at Layer $L_m$, as long as the data of the original pyramid $\{J^L\}$ in the third tracking window at Layer $L_m$ for the first iteration process has been read, the computing module may start the first iteration process, and continue to read the remaining data in the second tracking window.

The to-be-processed data at the present layer of the one of the image pyramids may include: data used in each iteration at the present layer of the one of the image pyramids. For example, in the KLT algorithm, the to-be-processed data of the second image pyramid at Layer $L_m$ may include the data used for the K iterations of the second pyramid at Layer $L_m$.

In certain embodiments of the present disclosure, when reading data in 701, the data processing method may sequentially read from the highest layer to the lowest layer of the pyramid. For example, first read the highest layer of one or more image pyramids, i.e. the to-be-processed data at Layer $L_m$. Then read the to-be-processed data of one or more image pyramids at Layer $L_m$–1 until the to-be-processed data of the 0-th layer of the one or more image pyramids is read.

If the reading is performed in the order of from the highest layer to the lowest layer of the pyramid, the reading function and the computing function can be performed in parallel, that is, there is no need for waiting for the calculation of the processing result at the present layer to finish. Instead, when the processing result at the present layer is being calculated, the to-be-processed data of one or more image pyramids at the next layer can be read from the first storage unit in order for computing the next layer. For example, in the KLT algorithm, when the present layer is Layer $L_m$, when computing the tracking point's offset correction $d^{L_m}$ at Layer $L_m$ and the predicted offset $g^{L_m-1}$ at Layer $L_m$–1, one may start to read the to-be-processed data at Layer $L_m$–1.

The to-be-processed data at the present layer of the one of the image pyramids may include: data of the one of the image pyramids within a tracking window at a present layer, where the position of the tracking window at the present layer is determined according to the processing result of the previous layer.

The following description uses the KLT algorithm as an example. In certain embodiments of the present disclosure, the one or more image pyramids may include: a first original pyramid of the first image and a second original pyramid of the second image, such as an original pyramid $\{I^L\}$ of Image I and the original pyramid $\{J^L\}$ of Image J. The to-be-processed data at any layer includes: data of the first original pyramid within a first tracking window at the present layer, and data of the second original pyramid within a second tracking window at the present layer. The position of the first tracking window is determined according to the position of the tracking point at the present layer data of the first original pyramid. The position of the second tracking window at the present layer is determined according to the processing result at layer previous to the present layer. Computing the processing result at the present layer according to the to-be-processed data at the present layer stored in the second storage unit includes: according to the to-be-processed data at the present layer stored in the second storage unit, and the gradient data of the first image at the present layer, computing the processing result at the present layer.

Optionally, the first image further has a gradient pyramid; the data processing method further includes: reading, from the first storage unit, the data of the gradient pyramid within the first tracking window at the present layer into the second storage unit; The gradient data at the present layer of the first image includes the data of the gradient pyramid within the first tracking window at the present layer stored in the second storage unit.

Optionally, the data processing method further includes: computing gradient data at the present layer of the first image pyramid according to data stored in the second storage unit of the first original pyramid within the first tracking window at the present layer.

Optionally, the data within the second tracking window at any layer includes: data used during every iteration for the second original pyramid at the present layer; wherein the one of the image pyramids includes: the second original pyramid. Step 702 includes: before the to-be-processed data at the present layer of the second image pyramids is read from the first storage unit, computing the processing result at the present layer using a multiple iteration process according to the to-be-processed data at the present layer of the first pyramid and the second pyramid stored in the second storage unit. When computing the processing result at the present layer, the to-be-processed data of the gradient pyramid at the present layer may also be included.

The to-be-processed data of the first original pyramid at the present layer includes: data of the first original pyramid within the first tracking window at the present layer. The to-be-processed data of the gradient pyramid at the present layer includes: the data of the gradient pyramid within the first tracking window at the present layer. The to-be-processed data of the second original pyramid at the present layer includes: data of the second original pyramid within the second tracking window at the present layer. Before the reading of the data within the second tracking window has been completed, the data processing method may begin the first iteration process.

Optionally, the processing result at any layer includes: an offset correction of the tracking point at the present layer and a predicted offset at the layer next to the present layer. Further, a positional offset of the tracking point from the first image to the second image may be obtained according to the offset correction and the predicted offset of the tracking point at the lowest layer. For example, based on the offset correction $d^0$ and the predicted offset $g^0$ at the lowest layer, the positional offset of the tracking point from Image I to Image J can be calculated. By incorporating the position of the tracking point in Image I, the position of the tracking point in Image J may be further calculated.

When using image pyramids for data processing, the reading module typically only reads the to-be-processed data for each layer of the image pyramid. Taking the KLT algorithm as an example, if the positional offset between the first tracking point between Image I and Image J is to be computed, during the reading process at Layer $L_m$, typically a data processing method only reads the image data of the images I and J within the tracking window, wherein the position and size of the tracking window are determined according to the position of the first tracking point. However, if other tracking points are to be calculated, such as the positional offset of a second tracking point is to be calculated, during the reading at Layer $L_m$, the data of Image I and Image J within the tracking window need to be read again, wherein the position and size of the tracking window are determined according to the position of the second tracking point. During this type of processes which require iteration processing, the to-be-processed data needs to be read by multiple reading operations, resulting in long time consumption and poor real-time performance.

Therefore, in certain embodiments of the present disclosure, one or more layers of data at the top of the image pyramid can be read at once, which can solve the above technical problem. Furthermore, the data size at the top of the image pyramids is usually small, and does not occupy excessive storage space. This aspect is specifically described below by way of an embodiment.

Figure 8:
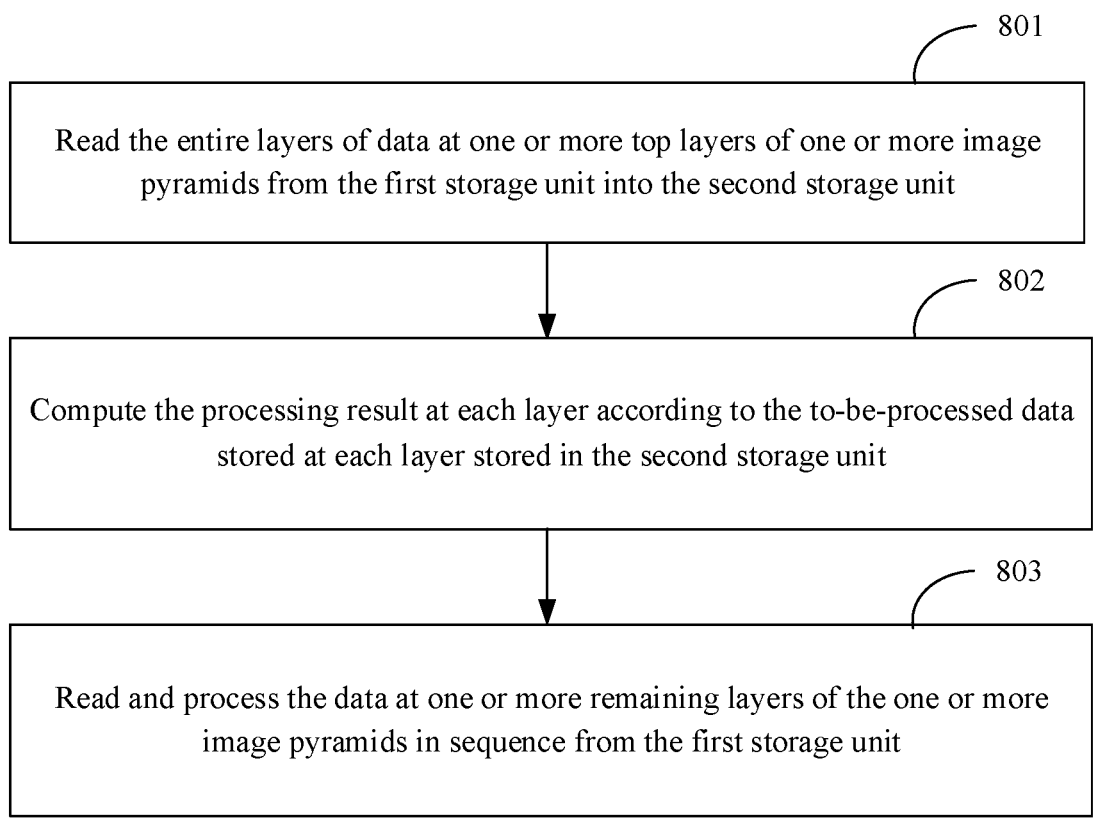
FIG. 8 is a flowchart of another method according to an embodiment of the present disclosure.

Referring to FIG. 8, another data processing method is provided. The data processing method includes the followings.

801: Reading the entire layers of data at one or more top layers of one or more image pyramids from the first storage unit into the second storage unit.

The system used in this embodiment includes at least two storage units, namely the first storage unit and the second storage unit. The to-be-processed data at the present layer of one or more image pyramids is stored in the first storage unit. For example, in the KLT algorithm, the first storage unit stores all the data of an image pyramid of Image I (for example, the original pyramid $\{I^L\}$) at Layer $L_m$, as well as all the data of the image pyramid of Image J (for example, the original pyramid $\{J^L\}$) at Layer $L_m$.

In certain embodiments of the present disclosure, in step 801, when the entire layers of data of one of the image pyramids at one or more top layers of the one or more image pyramids is read, the data is read from the first storage unit into the second storage unit at once. That is, by one reading operation, the entire layers of data of an image pyramid at one or more top layers of an image pyramid, or the entire layers of data of multiple image pyramids at one or more top layers of multiple image pyramids, is read from the first storage unit into the second storage unit. For example, in the KLT algorithm, read the entire layer of data of the original pyramid $\{J^L\}$ at Layer $L_m$ in a single reading operation.

In certain embodiments of the present disclosure, both the first storage unit and the second storage unit refer to a module having a storage function, such as a memory, a buffer, and so on. The first storage unit may be an external storage unit, and the second storage unit may be an internal storage unit. After the to-be-processed data is read from the first storage unit into the second storage unit, calculation at the present layer may be performed according to the to-be-processed data stored in the second storage unit.

802: Computing the processing result at each layer according to the to-be-processed data stored at each layer stored in the second storage unit.

In step 801, after reading one or more layers of data at the top of one or more image pyramids, the processing results at each layer can be computed based on the to-be-processed data at each layer. The to-be-processed data at each layer refers to the data used to compute the processing result at the present layer among the entire layer of data at the present layer. For example, in the KLT algorithm, at Layer $L_m$, the to-be-processed data of the original pyramid $\{I^L\}$ of Image I at the present layer includes: the data of the original pyramid $\{I^L\}$ of Image I within the first tracking window at Layer $L_m$, as well as the data of the original pyramid $\{J^L\}$ within the second tracking window at Layer $L_m$.

803: Reading and processing the data at one or more remaining layers of the one or more image pyramids in sequence from the first storage unit.

After computing the processing result of one or more layers of the top layer, or while computing the processing result, the data processing method may continue to read the data at each remaining layer from the first storage unit into the second storage unit. And the data processing method may further process the to-be-processed data stored in the second storage unit, and compute the processing result at each remaining layer.

According to the above technical solution, since the amount of data at the top of the image pyramid is generally small, in certain embodiments of the present disclosure, entire layers of data at one or more top layers are read into the second storage unit at once. For the data at each remaining layer, that is, the non-top data, only the to-be-processed data is read into the second storage unit. Thus, while without using excessive storage space, the data processing method may perform multiple iterations according to the entire layers of data at the top. For example, the data processing method may calculate the positional offset of multiple tracking points, without requiring separate reading operations during each cycle, thereby reducing time consumption and improving real-time performance.

The above embodiment may be specifically used in the data processing apparatus shown in FIG. 6, where the data processing apparatus includes a reading module 601 and a computing module 602. The reading module 601 is connected to the first storage unit 603 and the second storage unit 604, respectively, and the computing module 602 is connected to the second storage unit 604. The reading operation is performed by the reading module 601, and the computing operation of the embodiment of the present disclosure is performed by the computing module 602. Also, the data processing apparatus can be used in a circuit having a parallel processing function, and the reading module 601 and the computing module 602 have parallel processing functions. The circuit can include any of the following: a circuit having a multi-core processor, a parallel circuit system, and a digital logic circuit.

In certain embodiments, in Step 802, during the computation of the processing result at each layer, the data processing method may start from the highest layer of the pyramid, and sequentially calculate each layer with decreasing order according to the to-be-processed data at each layer stored in the second storage unit. For example, based on the highest layer of one or more image pyramids, i.e., the to-be-processed data at Layer $L_m$, compute the processing result at Layer $L_m$. Next based on the to-be-processed data of one or more image pyramids at $L_m$-1, compute the processing result at Layer $L_m$-1, and so on.

The to-be-processed data at the present layer of the one of the image pyramids may include: data of the one of the image pyramids within a tracking window at the present layer, where the position of the tracking window at the present layer is determined according to the processing result at the previous layer.

When computing the processing result at the present layer according to the to-be-processed data at the present layer, certain embodiments of the present disclosure are implemented by multiple iteration processes. For example, the data processing method may compute the processing result at each layer according to the to-be-processed data stored at each layer of the second storage unit, comprising: according to the to-be-processed data stored in the second storage unit at each layer, compute the processing result at each layer using multiple iteration processes.

Before the entire layer of data of one of the image pyramids at the present layer is read from the first storage unit, the processing result at the present layer may be computed according to the to-be-processed data at the present layer stored in the second storage unit. Take the KLT algorithm as an example, during the reading and computing processes at Layer $L_m$, before completing reading all the data of the original pyramid $\{J^L\}$ at Layer $L_m$, for example, after reading the data of the original pyramid $\{J^L\}$ in the second tracking window at Layer $L_m$, the data processing method may start computing the processing result at the present layer, and continue to read the remaining data in at Layer $L_m$. The to-be-processed data at the present layer of the one of the image pyramids may include: data used in each iteration at the present layer of the one of the image pyramids.

The following description uses the KLT algorithm as an example. In certain embodiments of the present disclosure, the one or more image pyramids may include: a first original pyramid of the first image, such as an original pyramid $\{I^L\}$ of Image I, and a second original pyramid of the second image, such as the original pyramid $\{J^L\}$ of Image J. The to-be-processed data at any layer includes: data of the first original pyramid within a first tracking window at the present layer, and data of the second original pyramid within a second tracking window at the present layer. The position of the first tracking window is determined according to the position of the tracking point at the present layer data of the first original pyramid. The position of the second tracking window at the present layer is determined according to the processing result at layer previous to the present layer. Computing the processing result at the present layer according to the to-be-processed data at each layer stored in the second storage unit includes: according to the to-be-processed data at each layer stored in the second storage unit, as well as the gradient data of the first image at each layer, computing the processing result at each layer.

Optionally, the first image further has a gradient pyramid. The data processing method further comprises: reading the data within the first tracking window of the gradient pyramid at the present layer from the first storage unit into the second storage unit; wherein the gradient data at the present layer of the first image includes: the data of the gradient pyramid within the first tracking window at the present layer stored in the second storage unit.

Optionally, the data processing method further includes: computing gradient data at each layer of the first image according to data stored in the second storage unit of the first original pyramid within the first tracking window at each layer.

Optionally, the processing result at any layer includes: the offset correction of the tracking point at the present layer and a predicted offset at the layer next to the present layer. Further, a positional offset of the tracking point from the first image to the second image may be obtained according to the offset correction and the predicted offset of the tracking point at the lowest layer. For example, based on the offset correction $d^0$ and the predicted offset $g^0$ at the lowest layer, the positional offset of the tracking point from Image I to Image J can be calculated. By incorporating the position of the tracking point in Image I, the position of the tracking point in Image J may be further calculated.

Corresponding to the above method embodiments, the present disclosure also provides corresponding apparatus embodiments, which are specifically described below.

Corresponding to the method embodiment shown in FIG. 3, the present disclosure further provides a visual tracking apparatus. The visual tracking apparatus of the certain embodiments is for obtaining a positional offset of a first tracking point from a first image to a second image; wherein the first image has a first original pyramid, and the second image has a second original pyramid. For example, the first image and the second image may be Image I and Image J respectively, where the first original pyramid is the original pyramid $\{I^L\}$ of Image I, and the second original image pyramid is the original pyramid $\{J^L\}$ of Image J, where $L=0,1,L, L_m, L_m \geq 1$.

The visual tracking apparatus according to certain embodiments includes a reading module and a computing module. For example, the visual tracking apparatus may comprise a reading module 401 and a computing module 402 shown in FIG. 4.

The reading module is configured to sequentially read window data at each layer from the first storage unit into the second storage unit from the highest layer to the lowest layer of the pyramid.

In certain embodiments of the present disclosure, all data of the first original pyramid and the second original pyramid are stored in the first storage unit. Both the first storage unit and the second storage unit refer to a module having a storage function, such as specifically a memory, a buffer, and so on. The first storage unit may be an external storage unit, and the second storage unit may be an internal storage unit. After the window data is read from the first storage unit into the second storage unit, calculation at each layer may be performed according to the window data stored in the second storage unit.

The window data at any layer includes: data of the first original pyramid within a first tracking window at the present layer, and data of the second original pyramid within a second tracking window at the present layer, where the data within the second tracking window at the present layer includes all the data that is used for iteratively computing the offset correction of the first tracking point at the present layer and the predicted offset at the next layer of the second original pyramid.

For example, Layer $L_m$'s window data includes: $I^{L_m}$'s data within the first tracking window and $J^{L_m}$'s data within the second tracking window, where $I^{L_m}$ is Layer $L_m$ of the original pyramid $\{I^L\}$, and $J^{L_m}$ is Layer $L_m$ of the second original pyramid.

The computing module is for, from the highest layer to the lowest layer of the pyramid, according to the window data of every layer stored in the second storage unit, and the gradient information at each layer of the first image, by using a plurality of iteration processes, computing the offset correction at each layer and the predicted offset at the layer next to the present layer of the first tracking point.

For example, at Layer $L_m$, according to the data of $I^{L_m}$ within the first tracking window and the data of $J^{L_m}$ within the second tracking window, by using a plurality of iteration processes, the offset correction $d^{L_m}$ at Layer $L_m$, and the predicted offset $g^{L_m-1}$ at Layer $L_m-1$, the computing module iteratively calculates the offset correction $d^{L_m-1}$ at Layer $L_m-1$ and the predicted offset $g^{L_m-2}$ Layer $L_m-2$, until the lowest layer's, that is, the 0-th layer's offset correction $d^0$ and predicted offset $g^0$ are calculated.

The computing module is further configured to obtain a positional offset of the first tracking point from the first image to the second image according to the predicted offset and the offset correction of the first tracking point at the lowest layer.

For example, by adding the offset correction $d^0$ and the predicted offset $g^0$ the lowest layer, that is, the 0-th layer, the positional offset d of the first tracking point from the first image to the second image can be obtained, that is, $d=d^0+g^0$. By combining the first tracking point's position u in Image I, the first tracking point's position v in Image J can be further calculated. For example, first tracking point's position v in Image J can be computed as v=u+d.

Typically, when reading data of the second original pyramid at any layer, at least K reading operations need to be performed to read K times. In certain embodiments, it is no longer necessary to read the data of the second original pyramid for K times. Instead, the data of the second original pyramid required in each iteration process at the present layer, that is, the data within the second tracking window, only requires one reading operation. Thus, it is not necessary to issue multiple reading requests, reducing the time to send and to respond to reading requests. Thereby, the reading process of the KLT tracking algorithm is optimized, the time consumption of the KLT tracking process is reduced, and the real-time performance is improved.

Optionally, the first image further has a gradient pyramid. The reading module is further configured to sequentially read, from the highest layer to the lowest layer of the pyramid, the data within the first tracking window of the gradient pyramid at each layer from the first storage unit into the second storage unit; wherein the gradient data at each layer of the first image includes: the data of the gradient pyramid within the first tracking window at each layer stored in the second storage unit.

Optionally, the computing module is further configured to calculate gradient data at each layer of the first image according to data stored in the second storage unit of the first original pyramid within a first tracking window at each layer.

In certain embodiments of the present disclosure, the reading module is connected to the first storage unit and the second storage unit, and the computing module is connected to the second storage unit. Moreover, the visual tracking apparatus can be used in a circuit having a parallel processing function, and the reading module and the computing module have parallel processing functions. The circuit may include any of the following: a circuit having a multi-core processor, a parallel circuit system, and a digital logic circuit.

The position of the first tracking window at any layer may be determined by the position of the first tracking point in the data of the first original pyramid. For example, the center of the first tracking window is at position $u^L$ at Layer L, which is $u^L=u/2^L$. Here, u is the position of the first tracking point in the first image.

Since the location of the first tracking window is not related to the calculation result of the previous layer, the reading function and the computing function can be performed in parallel in certain embodiments of the present disclosure. When computing the offset correction at the present layer and the corrected offset at the next layer according to the window data at any layer, the data of the first original pyramid within the first tracking window at the next layer can start to be read, thereby further reducing time consumption. For example, when computing the calculation result at Layer $L_m$ according to the window data at Layer $L_m$, the computing module may start reading the window data at Layer $L_m-1$. In fact, In certain embodiments of the present disclosure, after the window data at the present layer is read, the data reading of the first original image pyramid within the first tracking window at the next layer can be immediately started, and the present layer is simultaneously calculated, so that the reading operation can be continuously ran, resulting in saving of time consumption. If the window data at any layer further includes data of the gradient pyramid within the first tracking window at the present layer, when the data of the gradient pyramid within the first tracking window at the present layer is being calculated, the reading may also be started for the data of the gradient pyramid within the first tracking window at the layer next to the present layer.

If the reading module completes reading the data of the first original pyramid within the first tracking window at the layer next to the present layer, if the calculation result at the present layer is complete, that is, the offset correction at the present layer and the predicted offset at the next layer have been calculated, then the reading module may continue to read the data of the second original pyramid within the second tracking window at the next layer. If the calculation result at the present layer is not calculated, after waiting to calculate the calculation result at the present layer, according to the calculation result at the present layer, the data of the second original pyramid within the second tracking window at the next layer is read.

Here, any one iteration process may include: according to the result of the last iteration or the initial iteration parameters, the data of the first original pyramid within the first tracking window at the present layer, and the data of second original pyramid within the third tracking window of the present iteration at the present layer, calculating the result of the present iteration, wherein the position of the third tracking window of the iteration is determined according to the result of the last iteration or the initial iteration parameter. If the window data at any layer further includes data of the gradient pyramid within the first tracking window at the present layer, the result of the iteration is also calculated according to the gradient pyramid within the first tracking window at the present layer. The data within the second tracking window at the present layer may include: data within the third tracking window of the second original pyramid at the present layer of each iteration process.

For example, in the first iteration process at Layer $L_m$, according to the initial parameters $\bar{v}^0$, the data of $I^{L_m}$ in the first tracking window, the data of $I_A^{L_m}$ in the first tracking window, and the data of $J^{L_m}$ the third tracking window of the first iteration, the computing module may compute the calculation result of the first iteration $\bar{v}^1$. In the second iteration process at Layer $L_m$, according to the calculation result of first iteration $\bar{v}^1$, the data of $I^{L_m}$ in the first tracking window, the data of $I_A^{L_m}$ in the first tracking window, and the data of $J^{L_m}$ in the third tracking window of the second iteration, the computing module may compute the calculation result of the second iteration $\bar{v}^2$ and so on, until the result $\bar{v}^K$ of the K-th iteration is calculated. $\bar{v}^K$ is used as Layer $L_m$'s offset correction $d^{L_m}$, according to the offset correction $d^{L_m}$ and Layer $L_m$'s predicted offset $g^{L_m}$, the computing module may calculate Layer $L_m-1$'s predicted offset $g^{L_m-1}$. The initial iteration parameter can be set to $\bar{v}^0=[0\ 0]^T$, the Layer $L_m$'s predicted offset $g^{L_m}$ can be set to $g^{L_m}=[0\ 0]^T$. Data of $J^{L_m}$ in the second tracking window includes data of $J^{L_m}$ within the third tracking window during the K-th iteration.

Optionally, the location of the second tracking window at any layer may be determined according to the location in the data of the first tracking point at the present layer of the first original pyramid, the predicted offset at the present layer, and the spatial gradient matrix at the present layer.

In certain embodiments of the present disclosure, when reading the window data at any layer, the reading order of the reading module may be: first reading the data of the first original pyramid within the first tracking window at the present layer, and then reading the data of the second original pyramid within the second tracking window at the present layer. Therefore, the computing module does not need to wait for the reading of the data of the second original pyramid within the second tracking window at any layer to be finished. Even before the reading of the data within the second tracking window is started, the calculation of the offset of the first tracking point at the present layer and the predicted offset at the layer next to the present layer can be started. If the window data at any layer further includes data of the gradient pyramid within the first tracking window at the present layer, before reading the data of the second original pyramid, the reading module may start to read the data of the gradient pyramid within the first tracking window at the present layer.

For example, at Layer $L_m$, after reading $I^{Lm}$'s data within the first tracking window and $I_A^{Lm}$'s data within the first tracking window, the computing module begins to calculate the spatial gradient matrix G at Layer $L_m$'. After reading $J^{Lm}$'s data in the third tracking window for the first iteration, the computing module begins to perform the first iteration process. That is to say, the computing operation is started immediately after the data required for the calculation is obtained, and it is not necessary to wait for the data to be completely read.

In certain embodiments of the present disclosure, when the computing module is required to calculate the positional offsets of a plurality of tracking points from the first image to the second image, the above-mentioned visual tracking process needs to be repeated. At this time, the window data at each layer needs to be read again, and each time the layer's window data is determined based on the new tracking point. For example, if the positional offset of the first tracking point between Image I and Image J is to be computed, then during the reading process at Layer $L_m$, typically the reading module only reads the image data of the images I and J within the tracking window, where the position and size of the tracking window according to the position of the first tracking point. However, if other tracking points are calculated, such as the positional offset of a second tracking point is calculated, then during the reading at Layer $L_m$, the data of Image I and Image J within the tracking window need to be read again by the reading module, and the position and size of the tracking window are determined according to the position of the second tracking point. The to-be-processed data needs to be read by multiple reading operations, resulting in significant time consumption and poor real-time performance.

Therefore, in certain embodiments of the present disclosure, one or more top layers of data of an image pyramid can be read at once, which can solve the above technical problem. Furthermore, the data size at the top of the image pyramids is usually small, which does not occupy excessive storage space. Specifically, the reading module is further configured to: when reading data within the tracking window of one or more image pyramids at one or more top layers, further read the remaining data of the one or more image pyramid at the one or more top layers. The computing module is further configured to: obtain a positional offset of the second tracking point from the first image to the second image according to the remaining data; wherein the one or more image pyramids comprise the first original pyramid, and one or more of the second original pyramids. Optionally, the one or more image pyramids may further include gradient pyramids.

For example, the reading module reads all the data of $I^{Lm}$ at Layer $L_m$ into the second storage unit. At this time, both the window data at Layer $L_m$ and the remaining data at Layer $L_m$ is read. After this, when computing the positional offset of the second tracking point, it is not necessary to re-read the data of $I^{Lm}$ at Layer $L_m$. Instead, the remaining data is used to calculate the positional offset of the second tracking point from the first image to the second image, reducing the number of reading operations, thereby reducing time consumption. For the specific computing process to compute positional offset of the second tracking point, refer to the computing process of computing the positional offset of the first tracking point, which will not be described here again.

Corresponding to the method embodiment shown in FIG. 5, the present disclosure further provides an apparatus for data processing. The data processing apparatus includes: a reading module and a computing module. For example, as shown in FIG. 6, the data processing apparatus may include a reading module 601 and a computing module 602. The reading module is configured to read, from the first storage unit, the to-be-processed data at the present layer of one or more image pyramids into the second storage unit.

In certain embodiments of the present disclosure, the to-be-processed data at the present layer of one or more image pyramids is stored in the first storage unit. In fact, the first storage unit typically stores the entire layer of data for the present layer of the one or more image pyramids. For example, in the KLT algorithm, when the present layer is Layer $L_m$, the first storage unit stores all the data of an image pyramid of Image I (for example, the original pyramid $\{I^L\}$) at Layer $L_m$ as well as all the data of the image pyramid of Image J (for example, the original pyramid $\{J^L\}$) at Layer $L_m$.

The to-be-processed data at the present layer refers to data used to compute the processing result at the present layer among all the data at the present layer. For example, in the KLT algorithm, when the present layer is Layer $L_m$, the to-be-processed data of the original image pyramid $\{I^L\}$ of Image I at the present layer includes the data of the original image pyramid $\{I^L\}$ of Image I within the first tracking window at Layer $L_m$.

The computing module is configured to compute the processing result at the present layer according to the to-be-processed data at the present layer stored in the second storage unit.

In certain embodiments of the present disclosure, the first storage unit and the second storage unit refer to a module having a storage function, such as a memory, a buffer, and so on. The first storage unit may be an external storage unit, and the second storage unit may be an internal storage unit. After the reading module reads the to-be-processed data from the first storage unit into the second storage unit, the computing module may compute the processing result at the present layer according to the to-be-processed data stored in the second storage unit. For example, in the KLT algorithm, when the present layer is Layer $L_m$, according to the to-be-processed data at the present layer stored in the second storage unit, the computing module calculates the tracking point's offset correction $d^{Lm}$ at Layer $L_m$ and the predicted offset $g^{Lm-1}$ at Layer $L_m-1$.

When the computing module is computing the processing result at the present layer, the reading module reads the to-be-processed data at the next layer of the image pyramid from the first storage unit.

In certain embodiments of the present disclosure, the reading function and the computing function are performed in parallel. The reading module does not need to wait for the calculation of the processing result at the present layer to finish. Instead, when the processing result at the present layer is being calculated, the to-be-processed data at the next layer may be read. For example, in the KLT algorithm, when the present layer is Layer $L_m$, when computing the tracking point's offset correction $d^{L_m}$ at Layer $L_m$ and the predicted offset $g^{L_m-1}$ at Layer $L_m-1$, the reading module may start to read the to-be-processed data at Layer $L_m-1$.

The foregoing technical solution shows that the embodiments of the present disclosure achieve optimization of the data processing process, and the waiting time of the reading operation is reduced, thereby reducing time consumption and improving the real-time performance.

In certain embodiments of the present disclosure, the reading module is connected to the first storage unit and the second storage unit, and the computing module is connected to the second storage unit. Moreover, the data processing apparatus may be used in a circuit having a parallel processing function, and the reading module and the computing module have parallel processing functions. The circuit may include any of the following: a circuit having a multi-core processor, a parallel circuit system, and a digital logic circuit.

When computing the processing result at the present layer according to the to-be-processed data at the present layer, certain embodiments of the present are implemented by multiple iteration processes. Specifically, when computing the processing result at the present layer according to the to-be-processed data at the present layer stored in the second storage unit, the computing module is specifically configured to: compute the processing result at the present layer by using a plurality of iteration processes. However, since the data required during an iteration process is often determined by the iterative result of the last iteration, it results in the need to cyclically read data for the present layer's calculation, and for every reading operation, it needs to send a reading request and wait for the response to the reading request, resulting in increased time consumption of the reading operation, thereby causing the data processing take a long time.

For example, when the KLT algorithm is used to perform visual tracking, in the computing process at one layer of a pyramid, the data of the original pyramid $\{I^L\}$ needs to be read for at least one time. The data of the original pyramid $\{J^L\}$ needs to be read for at least K times, where K is the total number of iterations at the present layer. Since the reading speed is much slower than the calculation speed, the process of reading data often accounts for most of the tracking process, and can even account for 50%-75% of the entire tracking process.

In order to solve this problem, in certain embodiments of the present disclosure, the data used in every iteration can be read into the second processing unit at a single time, that is, by one reading operation, all of the data used in every iteration is read into the second processing unit, so that multiple cyclic reads are not required. Specifically, when reading the to-be-processed data at the present layer of the one or more image pyramids from the first storage unit into the second processing unit, the reading module is configured to: read the to-be-processed data at the present layer of the one or more image pyramids from the first storage unit into the second processing unit; where the to-be-processed data at the present layer of the one or more image pyramids includes data used in every iteration at the present layer of the one or more image pyramids.

Still using the KLT algorithm as an example, during the reading process at Layer $L_m$, in addition to reading the data of the original pyramid $\{I^L\}$ in the first tracking window at Layer $L_m$, also read the data of the original pyramid $\{J^L\}$ in the second tracking window at Layer $L_m$ in a single reading operation. The data in the second tracking window includes the data that is used tracking window is 15 pixels×15 pixels, and the size of the second tracking window may be 33 pixels×33 pixels. In the computing process at one layer of a pyramid, the data of the original pyramid $\{I^L\}$ needs to be read for one time, the data of and the original pyramid $\{J^L\}$ needs to be read for one time, thereby reducing time consumption and improving the real-time performance.

Before completing the reading operation, as long as the data needed in the first iteration process has been read, the computing process can be started for the present layer. Specifically, the computing module computes the processing result at the present layer by using a plurality of iteration processes, which includes starting to compute the processing result at the present layer by using a plurality of iteration processes before completing the reading process of the to-be-process data at the present layer. For example, in the KLT algorithm, during the reading and computing processes at Layer $L_m$, after reading the data of the original pyramid $\{I^L\}$ within the first tracking window at Layer $L_m$, before completing reading all the data of the original pyramid $\{J^L\}$ within the second tracking window at Layer $L_m$, as long as the data of the original pyramid $\{J^L\}$ within the third tracking window at Layer $L_m$ during the first iteration process has been read, the computing module may start the first iteration process, and the reading module may continue to read the remaining data in the second tracking window.

Optionally, the one or more image pyramids may include a first image pyramid and a second image pyramid. When reading the to-be-processed data of the image pyramid at the next layer from the first storage unit, the reading module is specifically configured to start to read the to-be-processed data of the first image pyramid at the next layer. The reading module is further configured to: after computing the processing result at the present layer, according to the processing result, read the to-be-processed data of the second image pyramid at the next layer from the first storage unit.

Optionally, the to-be-processed data at the next layer includes data of the first image pyramid within the first tracking window at the next layer, and data of the second image pyramid within the second tracking window at the next layer. The position of the second tracking window at the next layer is determined according to the processing result at the present layer.

Optionally, the first image pyramid includes a first original pyramid of the first image, for example, an original pyramid $\{I^L\}$ of Image I; the second image pyramid includes a second original pyramid of the second image, such as the original pyramid $\{J^L\}$ of Image J. The to-be-processed data at any layer includes: data of the first original pyramid within a first tracking window at the present layer, and data of the second original pyramid within a second tracking window at the present layer. The position of the first tracking window is determined according to the position of the tracking point in the data at the present layer of the first original pyramid. The position of the second tracking window at the present layer is determined according to the processing result at layer previous to the present layer. Computing the processing result at the present layer according to the to-be-processed data at the present layer stored in the second storage unit includes: according to the to-be-processed data at the present layer stored in the second storage unit, and the gradient data of the first image at the present layer, computing the processing result at the present layer.

Optionally, the first image further has a gradient pyramid. The reading module is further configured to: read the data within the first tracking window of the gradient pyramid at the present layer from the first storage unit into the second storage unit. The gradient data of the current stage of the first image includes data stored in the second storage unit and the gradient pyramid is within the first tracking window at the present layer.

Optionally, the computing module is further configured to calculate gradient data at the present layer of the first image pyramid according to data stored in the second storage unit of the first original pyramid within a first tracking window at each layer.

Optionally, the data within the second tracking window at any layer includes: data used during every iteration of the second original pyramid at the present layer.

Optionally, the processing result at any layer includes: the offset correction of the tracking point at the present layer and the predicted offset at the layer next to the present layer. The computing module may be further configured to obtain a positional offset of the tracking point from the first image to the second image according to the offset correction and the predicted offset of the tracking point at the lowest layer. For example, based on the offset correction $d^0$ and the predicted offset $g^0$ at the lowest layer, obtain the positional offset of the tracking point from Image I to Image J. By incorporating the position of the tracking point in Image I, the computing module further calculates the position of the tracking point in Image J.

Corresponding to the method embodiment shown in FIG. 7, the present disclosure further provides another data processing apparatus. The data processing apparatus includes: a reading module and a computing module. For example, as shown in FIG. 6, the data processing apparatus may include a reading module 601 and a computing module 602.

The reading module is configured to read one or more layers of the to-be-processed data of the one or more image pyramids from the first storage unit into the second storage unit. In certain embodiments of the present disclosure, the first storage unit stores the to-be-processed data of one image pyramid at one or more layers, or the to-be-processed data of multiple image pyramids at one or more layers. In fact, the first storage unit typically stores the entire layers of one or more layers of data of the one or more image pyramids. For example, in the KLT algorithm, the first storage unit stores all the data of an image pyramid of Image I (for example, the original pyramid $\{I^L\}$) at one or more layers, as well as all the data of the image pyramid of Image J (for example, the original pyramid $\{J^L\}$) at one or more layers.

The to-be-processed data at one or more layer refers to data used to compute the processing result at one or more layers among all the data at the one or more layers. For example, in the KLT algorithm, for Layer $L_m$, the to-be-processed data of the original image pyramid $\{I^L\}$ of Image I at the present layer includes the data of the original image pyramid $\{I^L\}$ of Image I within the first tracking window at Layer $L_m$.

In certain embodiments of the present disclosure, when the reading module reads the to-be-processed data at the present layer of one of the image pyramids, the data is read from the first storage unit into the second storage unit at once. That is, by one reading operation, the to-be-processed data at the present layer of one of the image pyramids is read from the first storage unit into the second storage unit. For example, in the KLT algorithm, during the reading process at Layer $L_m$, the reading module reads the data of the original pyramid $\{J^L\}$ within the second tracking window at Layer $L_m$ in a single reading operation. The data within the second tracking window includes the data that is used for the K iterations of the original pyramid $\{J^L\}$ at Layer $I_m$.

In certain embodiments of the present disclosure, both the first storage unit and the second storage unit refer to a module having a storage function, such as a memory, a buffer, and so on. The first storage unit may be an external storage unit, and the second storage unit may be an internal storage unit. After the to-be-processed data is read from the first storage unit into the second storage unit, calculation at the present layer may be performed according to the to-be-processed data stored in the second storage unit.

The computing module is configured to: before the reading module completes reading the to-be-processed data at the present layer of the one of the image pyramids from the first storage unit, compute the processing result at the present layer according to the to-be-processed data at the present layer of the one or more image pyramids stored in the second storage unit.

In certain embodiments of the present disclosure, when the reading module reads the to-be-processed data at the present layer of one of the image pyramids at once, the computing modules does not need to wait for the data to be completely read before starting to compute the processing result at the present layer. Instead, the calculation for the present layer can be started before the reading the data of an image pyramid at the present layer is completed, as long as enough data that can satisfy starting the calculation has been read.

According to the foregoing technical solution, in certain embodiments of the present disclosure, it is not necessary to wait for the data to be completely read before starting to compute the processing result at the present layer. Instead, the calculation may be started before the reading is completed, thereby further optimizing the data processing process, reducing time consumption, and improving real-time performance.

In certain embodiments of the present disclosure, the reading module is respectively connected to the first storage unit and the second storage unit, and the computing module is connected to the second storage unit. Moreover, the data processing apparatus can be used in a circuit having a parallel processing function, and the reading module and the computing module have parallel processing functions. The circuit may include any of the following: a circuit having a multi-core processor, a parallel circuit system, and a digital logic circuit.

When computing the processing result at the present layer according to the to-be-processed data at the present layer, certain embodiments of the present disclosure are usually implemented by multiple iteration processes. Specifically, when computing the processing result at the present layer according to the to-be-processed data of one or more image pyramids at the present layer stored in the second storage unit, the computing module is specifically configured to: according to the to-be-processed data of one or more image pyramids at the present layer stored in the second storage unit, start computing the processing result at the present layer by using a plurality of iteration processes.

When the reading module finishes reading the data required for the first iteration, the computing module may start computing the processing result at the present layer. Take the KLT algorithm as an example, during the reading and computing processes at Layer $L_m$, after the reading module reads the data of the original pyramid $\{I^L\}$ in the first tracking window at Layer $I_m$, before completing reading all the data of the original pyramid $\{J^L\}$ in the second tracking window at Layer $L_m$, as long as the data of the original pyramid $\{J^L\}$ in the third tracking window at Layer $L_m$ for the first iteration process has been read, the computing module may start the first iteration process, and continue to read the remaining data in the second tracking window.

The to-be-processed data at the present layer of the one of the image pyramids may include: data used in each iteration at the present layer of the one of the image pyramids. For example, in the KLT algorithm, the to-be-processed data may of the second image pyramid at Layer $L_m$ may include the data used for the K iterations of the second pyramid at Layer $L_m$.

Optionally, when one or more layers of one or more image pyramids are read from the first storage unit into the second storage unit, the reading module is specifically configured to: from the highest layer to the lowest layer of the pyramid, sequentially read the to-be-processed data at one or more layers of the one or more image pyramids from the first storage unit into the second storage unit. For example, first read the highest layer of one or more image pyramids, i.e. the to-be-processed data at Layer $L_m$. Then read the to-be-processed data of one or more image pyramids at Layer $L_m-1$ until the to-be-processed data of the 0-th layer of the one or more image pyramids is read.

If the reading is sequentially performed from the highest layer to the lowest layer of the pyramid, the reading module may be further configured to: when the computing module is computing the processing result at the present layer, read the to-be-processed data of one or more image pyramids at the next layer from the first storage unit in order for computing the next layer. For example, in the KLT algorithm, when the present layer is Layer $L_m$, when computing the tracking point's offset correction $d^{L_m}$ at Layer $L_m$ and the predicted offset $g^{L_m-1}$ at Layer $L_m-1$, it may start to read the to-be-processed data at Layer $L_m-1$.

The to-be-processed data at the present layer of the one of the image pyramids may include: data of the one of the image pyramids within a tracking window of a present layer, where the position of the tracking window at the present layer is determined according to the processing result of the previous layer.

Optionally, the one or more image pyramids may include: a first original pyramid of the first image and a second original pyramid of the second image, such as an original pyramid $\{I^L\}$ of Image I and the original pyramid $\{J^L\}$ of Image J. The to-be-processed data at any layer includes: data of the first original pyramid within a first tracking window at the present layer, and data of the second original pyramid within a second tracking window at the present layer. The position of the first tracking window is determined according to the position of the tracking point at the present layer data of the first original pyramid. The position of the second tracking window at the present layer is determined according to the processing result at layer previous to the present layer. Computing the processing result at the present layer according to the to-be-processed data at each layer stored in the second storage unit includes: according to the to-be-processed data at each layer stored in the second storage unit, and the gradient data of the first image at each layer, computing the processing result at each layer.

Optionally, the first image further has a gradient pyramid. The reading module is further configured to: read the data within the first tracking window of the gradient pyramid at the present layer from the first storage unit into the second storage unit; wherein the gradient data at the present layer of the first image includes: the data of the gradient pyramid within the first tracking window at the present layer stored in the second storage unit.

Optionally, the computing module is further configured to calculate gradient data at the present layer of the first image pyramid according to data stored in the second storage unit of the first original pyramid within a first tracking window at each layer.

Optionally, the data within the second tracking window at any layer includes: data used during every iteration for the second original pyramid at the present layer; wherein the one of the image pyramids includes: the second original pyramid. When the to-be-processed data of the one of the image pyramids at the present layer is read from the first storage unit, the reading module is specifically configured to: complete reading to-be-processed data at the present layer of the second original pyramid from the first storage unit. When computing the processing result at the present layer according to the to-be-processed data at the present layer of the one or more image pyramids of the second storage unit, the computing module is specifically configured to: according to the to-be-processed data of the first and the second original pyramids at the present layer stored in the second storage unit, begin to compute the processing result at the present layer through a plurality of iteration processes. When computing the processing result at the present layer, the to-be-processed data of the gradient pyramid at the present layer may also be included.

The to-be-processed data of the first original pyramid at the present layer includes data of the first original pyramid within the first tracking window at the present layer. The to-be-processed data of the gradient pyramid at the present layer includes the data of the gradient pyramid within the first tracking window at the present layer. The to-be-processed data of the second original pyramid at the present layer includes data of the second original pyramid within the second tracking window at the present layer. Before the data within the second tracking window has been read completely, the computing module may begin the first iteration process.

Optionally, the processing result at any layer includes: the offset correction of the tracking point at the present layer and the predicted offset at the layer next to the present layer. The computing module can be further configured to obtain a positional offset of the tracking point from the first image to the second image according to the offset correction and the predicted offset of the tracking point at the lowest layer. For example, based on the offset correction $d^0$ and the predicted offset $g^0$ at the lowest layer, the positional offset of the tracking point from Image I to Image J is calculated. By incorporating the position of the tracking point in Image I, the computing module further calculates the position of the tracking point in Image J.

Corresponding to the method embodiment shown in FIG. 8, the present disclosure further provides another data processing apparatus.

The data processing apparatus includes: a reading module and a computing module. For example, as shown in FIG. 6, the data processing apparatus may include a reading module 601 and a computing module 602.

The reading module is configured to read the entire layers of one or more top layers of one or more image pyramids from the first storage unit into the second storage unit.

The first storage unit usually stores all the data of the one or more image pyramids. For example, in the KLT algorithm, the first storage unit stores all the data of an image pyramid of Image I (for example, the original pyramid $\{I^L\}$), as well as all the data of the image pyramid of Image J (for example, the original pyramid $\{J^L\}$).

In certain embodiments of the present disclosure, when the reading module reads the entire layers of data at one or more top layers of the one or more image pyramids, the data is read from the first storage unit into the second storage unit at once. That is, by one reading operation, the entire layers of data of an image pyramid at one or more top layers, or the entire layers of data of multiple image pyramids at one or more top layers, is read from the first storage unit into the second storage unit. For example, in the KLT algorithm, read the entire layer of data of the original pyramid $\{J^L\}$ at Layer $L_m$ in a single reading operation.

In certain embodiments of the present disclosure, both the first storage unit and the second storage unit refer to a module having a storage function, such as a memory, a buffer, and so on. The first storage unit may be an external storage unit, and the second storage unit may be an internal storage unit. After the to-be-processed data is read from the first storage unit into the second storage unit, calculation at the present layer may be performed according to the to-be-processed data stored in the second storage unit.

The computing module is configured to compute the processing result at each layer according to the to-be-processed data stored at each layer of the second storage unit.

After the reading module reads one or more top layers of data of one or more image pyramids, the computing module may compute the processing results at each layer according to the to-be-processed data at each layer. The to-be-processed data at each layer refers to the data used to compute the processing result at the present layer among the entire layer of data at the present layer. For example, in the KLT algorithm, at Layer $L_m$, the to-be-processed data of the original pyramid $\{I^L\}$ of Image I at the present layer includes: the data of the original pyramid $\{I^L\}$ of Image I within the first tracking window at Layer $L_m$, as well as the data of the original pyramid $\{J^L\}$ within the second tracking window at Layer $L_m$.

The reading module and the computing module are further configured to sequentially read and process the to-be-processed data of each of the remaining layers of the image pyramids from the first storage unit.

After the computing module finishes computing the processing result of one or more top layers, or during the calculation, the reading module continues to read the data at each remaining layer from the first storage unit into the second storage unit. And the computing module processes the to-be-processed data of each remaining layer stored in the second storage unit, and calculates the processing result of each remaining layer.

According to the foregoing technical solution, while without using excessive storage space, certain embodiments can perform multiple iterations according to the entire layers of data at the top, without requiring separate reading operations during each iteration, thereby reducing time consumption and improving real-time performance.

In certain embodiments of the present disclosure, the reading module is respectively connected to the first storage unit and the second storage unit, and the computing module is connected to the second storage unit. Moreover, the data processing apparatus can be used in a circuit having a parallel processing function, and the reading module and the computing module have parallel processing functions. The circuit may include any of the following: a circuit having a multi-core processor, a parallel circuit system, and a digital logic circuit.

Optionally, when computing the processing result at each layer according to the to-be-processed data at each layer stored the second storage unit, the computing module is specifically configured to start from the highest layer of the pyramid, in descending order of layer by layer, and compute the processing result at each layer according to the to-be-processed data at each layer stored in the second storage unit. For example, the computing module first computes the processing result at Layer $L_m$ based on the highest layer of one or more image pyramids, i.e., the to-be-processed data at Layer $L_m$. Next, the computing module computes the processing result at Layer $L_m-1$ based on the to-be-processed data of one or more image pyramids at Layer $L_m-1$, and so on.

The to-be-processed data at the present layer of the one of the image pyramids may include: data of the one of the image pyramids within a tracking window at a present layer, where the position of the tracking window at the present layer is determined according to the processing result of the previous layer.

When computing the processing result at each layer according to the to-be-processed data at each layer, certain embodiments are implemented by multiple iteration processes. Specifically, when computing the processing result at each layer according to the to-be-processed data stored at each layer of the second storage unit, the computing module is specifically used to: according to the to-be-processed data stored in the second storage unit at each layer, compute the processing result at each layer using multiple iteration processes.

Before the reading module completes reading the entire layer of data of one of the image pyramids at the present layer from the first storage unit, the computing module may compute the processing result at the present layer according to the to-be-processed data at the present layer stored in the second storage unit. Take the KLT algorithm as an example, during the reading and computing processes at Layer $L_m$, before completing reading all the data of the original pyramid $\{J^L\}$ at Layer $L_m$, for example, after reading the data of the original pyramid $\{J^L\}$ in the second tracking window at Layer $L_m$, the computing module may start computing the processing result at the present layer, and continue to read the remaining data at Layer $L_m$.

In certain embodiments of the present disclosure, the one or more image pyramids may include: a first original pyramid of the first image, such as an original pyramid $\{I^L\}$ of Image I, and a second original pyramid of the second image, such as the original pyramid $\{J^L\}$ of Image J. The to-be-processed data at any layer includes: data of the first original pyramid within a first tracking window at the present layer, and data of the second original pyramid within a second tracking window at the present layer. The position of the first tracking window is determined according to the position of the tracking point in the data at the present layer of the first original pyramid. The position of the second tracking window at the present layer is determined according to the processing result at the layer previous to the present layer. Computing the processing result at the present layer according to the to-be-processed data at each layer stored in the second storage unit includes: according to the to-be-processed data at each layer stored in the second storage unit, and the gradient data of the first image at each layer, computing the processing result at each layer.

Optionally, the first image further has a gradient pyramid. The reading module is further configured to: read the data within the first tracking window of the gradient pyramid at the present layer from the first storage unit into the second storage unit; wherein the gradient data at the present layer of the first image includes: the data of the gradient pyramid within the first tracking window at the present layer stored in the second storage unit.

Optionally, the computing module is further configured to calculate gradient data at each layer of the first image according to data stored in the second storage unit of the first original pyramid within a first tracking window at each layer.

Optionally, the processing result at any layer includes: the offset correction of the tracking point at the present layer and a predicted offset at the layer next to the present layer. The computing module can be further configured to: obtain a positional offset of the tracking point from the first image to the second image according to the offset correction and the predicted offset of the tracking point at the lowest layer. For example, based on the offset correction $d^0$ and the predicted offset $g^0$ at the lowest layer, the positional offset of the tracking point from Image I to Image J is obtained. By incorporating the position of the tracking point in Image I, the computing module further calculates the position of the tracking point in Image J.

The present disclosure also provides a system of a visual tracking system. The visual tracking system in certain embodiments is configured to obtain a positional offset of a first tracking point from a first image to a second image; the first image has a first original pyramid, and the second image has a second original pyramid. The system includes a first storage unit, a second storage unit, and a visual tracking apparatus, the apparatus comprising a reading module and a computing module. For example, as shown in FIG. 4, the visual tracking system includes a first storage unit 403, a second storage unit 404, and a visual tracking apparatus, the visual tracking apparatus including a reading module 401 and a computing module 402.

The first storage unit stores data of all layers of the first original image pyramid and the second original pyramid.

The reading module is configured to sequentially read the window data at each layer from the highest layer to the lowest layer of the pyramids from the first storage unit into the second storage unit. The window data at any layer includes: data of the first original pyramid within a first tracking window at the present layer, and data of the second original pyramid within a second tracking window at the present layer, where the data within the second tracking window at the present layer includes all the data that is used for iteratively computing the offset correction of the first tracking point at the present layer and the predicted offset at the next layer of the second original pyramid.

The computing module is for, from the highest layer to the lowest layer of the pyramids, according to the window data of every layer stored in the second storage unit, and the gradient information at each layer of the first image, by using a plurality of iteration processes, computing the offset correction at each layer and the predicted offset at the layer next to the present layer of the first tracking point.

The computing module is further configured to obtain a positional offset of the first tracking point from the first image to the second image according to the predicted offset and the offset correction of the first tracking point at the lowest layer.

The above embodiment corresponds to FIG. 3 and the embodiment of the visual tracking apparatus corresponding to FIG. 3. For details, refer to the related description of the foregoing embodiment, and details are not described herein again.

The present disclosure also provides a system embodiment of a data processing system. The data processing system includes: a first storage unit, a second storage unit, and a data processing apparatus, the apparatus comprising: a reading module and a computing module. For example, as shown in FIG. 6, the data processing system includes a first storage unit 603, a second storage unit 604, and a data processing apparatus, the data processing apparatus comprising a reading module 601 and a computing module 602.

The first storage unit stores data of all layers of at least one image pyramid. The reading module is configured to read, from the first storage unit, the to-be-processed data at the present layer of one or more image pyramids into the second storage unit. The computing module is configured to compute the processing result at the present layer according to the to-be-processed data at the present layer stored in the second storage unit.

When the computing module is computing the processing result at the present layer, the reading module reads the to-be-processed data at the next layer of the image pyramid from the first storage unit.

The above data processing system may be configured to perform the data processing method corresponding to FIG. 5. For details, refer to the related description of the foregoing embodiment, and details are not described herein again.

The present disclosure also provides another data processing system. The data processing system of this embodiment includes: a first storage unit, a second storage unit, and a data processing apparatus, the apparatus comprising: a reading module and a computing module. For example, as shown in FIG. 6, the data processing system includes a first storage unit 603, a second storage unit 604, and a data processing apparatus, the data processing apparatus comprising a reading module 601 and a computing module 602.

The first storage unit stores data of all layers of at least one image pyramid. The reading module is configured to read, from the first storage unit, the to-be-processed data at the present layer of one or more image pyramids into the second storage unit. the data is read from the first storage unit into the second storage unit at once. The computing module is configured to: according to the one or more image pyramids stored in the second storage unit, before the reading module completes reading the to-be-processed data at the present layer of the one of the image pyramids from the first storage unit, begin to compute the processing result at the present layer.

The above data processing system may be configured to perform the data processing method corresponding to FIG. 7. For details, refer to the related description of the foregoing embodiment, and details are not described herein again.

The present disclosure also provides data processing system. The data processing system of includes: a first storage unit, a second storage unit, and a data processing apparatus, the apparatus comprising: a reading module and a computing module. For example, as shown in FIG. 6, the data processing system includes a first storage unit 603, a second storage unit 604, and a data processing apparatus, the data processing apparatus including a reading module 601 and a computing module 602.

The first storage unit stores data of all layers of at least one image pyramid. The reading module is configured to, from the first storage unit, read the entire layers of data at one or more top layers of image the pyramids top-layer into the second storage unit. The computing module is configured to compute the processing result at each layer according to the to-be-processed data stored at each layer of the second storage unit. The reading module and the computing module are further configured to sequentially read and process the to-be-processed data of each of the remaining layers of the image pyramid from the first storage unit.

This above data processing system may be configured to perform the data processing method corresponding to FIG.

8. For details, refer to the related description of the foregoing embodiment, and details are not described herein again.

The present disclosure further provides a computer storage medium. The embodiment is configured to obtain a positional offset of a first tracking point from a first image to a second image. The first image has a first original pyramid. The second image has a second original pyramid.

The computer storage medium of certain embodiments includes computer program code that is executed by a computer unit to perform the following steps.

From the highest layer to the lowest layer of the pyramid, the computer unit sequentially read the window data at each layer is from the first storage unit into the second storage unit. The window data at any layer includes: data of the first original pyramid within a first tracking window at the present layer, and data of the second original pyramid within a second tracking window at the present layer, where the data within the second tracking window at the present layer includes all the data that is used for iteratively computing the offset correction of the first tracking point at the present layer and the predicted offset at the next layer of the second original pyramid.

From the highest layer to the lowest layer of the pyramid, according to the window data of every layer stored in the second storage unit, and the gradient information at each layer of the first image, by using a plurality of iteration processes, the computer unit compute the offset correction at each layer and the predicted offset at the layer next to the present layer of the first tracking point.

The computer unit obtains a positional offset of the first tracking point from the first image to the second image according to the predicted offset and offset correction of the first tracking point at the lowest layer.

The above embodiment corresponds to FIG. 3 and the embodiment of the visual tracking apparatus corresponding to FIG. 3. For details, refer to the related description of the foregoing embodiment, and details are not described herein again.

The present disclosure further provides another computer storage medium. The computer storage medium of the embodiment includes a computer program code, and the computer program code is executed by a computer unit.

The computer unit reads the to-be-processed data at the present layer of the one or more image pyramids from the first storage unit into the second storage unit. The computer unit computes the processing result at the present layer according to the to-be-processed data at the present layer stored in the second storage unit. When computing the processing result at the present layer, the computer unit reads the to-be-processed data at the next layer of the image pyramids from the first storage unit.

The above computer storage medium may be configured to perform the data processing method corresponding to FIG. 5. For details, refer to the related description of the foregoing embodiment, and details are not described herein again.

The present disclosure further provides another computer storage medium. The computer storage medium includes a computer program code, and the computer program code is executed by a computer unit.

The computer unit reads to-be-processed data at one or more layers of one or more image pyramids from the first storage unit into the second storage unit. When reading the to-be-processed data at the present layer of one of the image pyramids, the data is read from the first storage unit into the second storage unit at once.

Before the to-be-processed data at the present layer of the one of the image pyramids is completely read from the first storage unit, the computer unit computes the processing result at the present layer according to the to-be-processed data at the present layer of the one or more image pyramids stored in the second storage unit.

The above computer storage medium may be configured to perform the data processing method corresponding to FIG. 7. For details, refer to the related description of the foregoing embodiment, and details are not described herein again.

The present disclosure further provides another computer storage medium. The computer storage medium includes a computer program code, and the computer program code is executed by a computer unit.

The computer unit reads the entire layers of data at one or more top layers of one or more image pyramids from the first storage unit into the second storage unit. The computer unit computes the processing result at each layer according to the to-be-processed data stored at each layer of the second storage unit. The computer unit sequentially reads the to-be-processed data at each of the remaining layers of the image pyramids from the first storage unit.

The above embodiment corresponds to FIG. 8 and the embodiment of the data processing apparatus corresponding to FIG. 8. For details, refer to the related description of the foregoing embodiment, and details are not described herein again.

Figure 9:
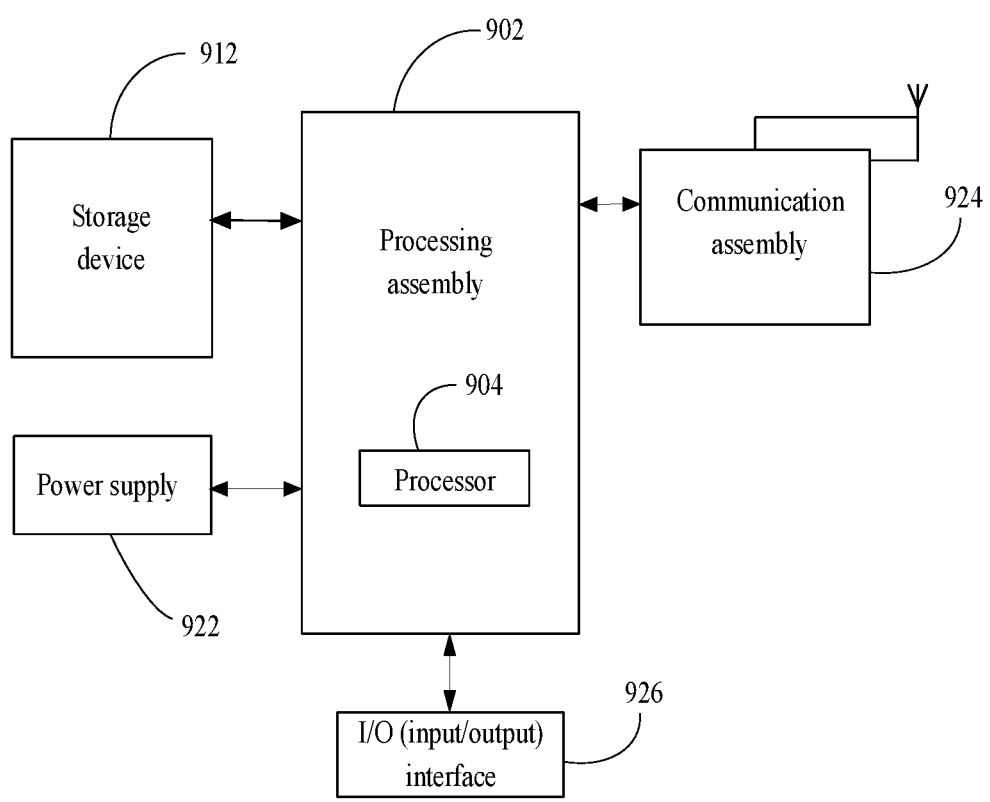
FIG. 9 shows an exemplary signal processing apparatus.

FIG. 9 shows an embodiment of the signal processing apparatus. The signal processing apparatus may comprise one or more of the following components: processing assembly 902 with one or more processors 904, storage device 912, power supply 922, I/O (input/output) interface 926, and communication assembly 926.

Processing assembly 902 typically controls the overall operations of signal processing apparatus, and may comprise one or more processors 904 to execute instructions to perform all or part of the steps of the above-described signal processing methods. Moreover, processing assembly 902 can comprise one or more modules to facilitate interaction between various components of the signal processing apparatus. For example, processing assembly 902 may facilitate interaction with a user through the I/O (input/output) interface 926 or the communication assembly 926.

The storage device 912 is configured to store various types of data to support operation of the signal processing apparatus. Examples of such data comprise instructions for any application or method operating on the apparatus. The storage device 912 may also serve as the first and the second storage unit in certain embodiments. The storage device 912 may be implemented by any type of volatile or non-volatile storage device or a combination thereof, such as SRAM (Static Random-Access Memory), EEPROM (Electrically-Erasable Programmable Read-Only Memory), EPROM (Erasable Programmable Read Only Memory), PROM (Programmable Read-Only Memory), ROM (Read-Only Memory), magnetic memory, flash memory, disk or optical disk.

Power supply 922 provides power to various components of the data processing apparatus. Power supply 922 may comprise a power management system, one or more power sources, and other components associated with generating, managing, and distributing power for the apparatus.

The I/O interface 926 provides an interface between the processing assembly 902 and the peripheral interface module, which may comprise a display terminal, a keyboard, a click wheel, a button, or the like.

The communication assembly 924 is configured to facilitate wired or wireless communication between the signal processing apparatus and other devices. The apparatus may access a wireless network based on a communication standard, such as WiFi, 2G or 3G, or a combination thereof. In an exemplary embodiment, the communication assembly 924 receives broadcast signals or broadcast associated information from an external broadcast management system via a broadcast channel. In an exemplary embodiment, the communication assembly 924 also comprises an NFC (Near Field Communication) module to facilitate short-range communication. For example, the NFC module can be based on RFID (Radio Frequency Identification) technology, IrDA (Infra-red Data Association) technology, UWB (Ultra Wideband) technology, BT (Bluetooth) technology and others.

In an exemplary embodiment, the signal processing apparatus may be configured by one or more ASICs (Application Specific Integrated Circuits), DSP (Digital Signal Processor), PLD (Programmable Logic Device), FPGA (Field Programmable Gate Array), controller, microcontroller, microprocessor or other electronic component implementation for executing the above commands Transmission method.

In an exemplary embodiment, there is also provided a non-transitory computer readable storage medium comprising instructions, such as a storage device 912 including instructions. The instructions are executable by processor 904 of processing assembly 902 to perform the foregoing data processing and visual tracking methods. For example, the non-transitory computer readable storage medium may be ROM, RAM (Random Access Memory), CD-ROM (Compact Disc Read-Only Memory), tape, floppy disks, and optical data storage devices, etc.

In certain embodiments, the data processing methods and apparatuses in the forgoing description may be used in applications requiring real-time target tracking. For example, unmanned aerial vehicles (UAVs) may be equipped with surveillance cameras for tracking stationery or moving targets. Signal and image processing methods may be applied to analyze the video footage to track an object while either or both of the UAC and the target are moving. In many instances, the tracking and surveillance are required to be performed in real time. For example, the UAV may need to follow the moving target and lock it into the center of the camera lens. In these instances, video tracking and data processing methods such as provided in the present disclosure may provide the required real-time performance.

In the several embodiments provided in the present disclosure, it should be understood that the disclosed device and method may be realized in other manners. The device embodiments described above are merely exemplary. All functional modules or units in the embodiments of the present disclosure may all be integrated into one processing unit, or each unit may be used as a single unit. Further, the functional modules or units may be implemented by computer executable program instructions stored in computer readable medium. When executed by one or more processors, the computer executable program instructions may implement the corresponding functions of each module or unit. Two or more units may be integrated into one. The above-integrated unit can either be implemented in the form of hardware, or in the form of hardware combined with software functional units.

A person skilled in the art can clearly understand that for the convenience and brevity of the description, the specific working process of the system, the device and the unit described above can refer to the corresponding process in the foregoing method embodiment, and details are not described herein again.

In the several embodiments provided by the present disclosure, it should be understood that the disclosed system, apparatus, and method may be implemented in other manners. For example, the device embodiments described above are merely illustrative. For example, the division of the units is only a logical function division. In actual implementation, there may be another division manner, for example, multiple units or components may be combined or integrated into another system. Some features can be omitted or not executed. In addition, the coupling or direct coupling or communication connection shown or discussed may be an indirect coupling or communication connection through some interface, device or unit, and may be electrical, mechanical or otherwise.

The units described as separate components may or may not be physically separated, and the components displayed as units may or may not be physical units. That is, may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately, or two or more units may be integrated into one unit. The above integrated unit can be implemented in the form of hardware or in the form of a software functional unit.

The integrated unit, if implemented in the form of a software functional unit and sold or used as a standalone product, may be stored in a computer readable storage medium. Based on such understanding, the technical solution of the present disclosure, in essence or as the contribution to the prior art, or all or part of the technical solution may be embodied in the form of a software product stored in a storage medium. A number of instructions are included to cause a computer device (which may be a personal computer, server, or network device, etc.) to perform all or part of the steps of the methods described in various embodiments of the present disclosure. The storage medium includes: U disk, removable hard disk, a read-only memory (ROM, Read-Only Memory), a random-access various memory (RAM, Random Access Memory), a magnetic disk, or an optical medium that can store program codes.

The above embodiments are only used to explain the technical solutions of the present disclosure, and are not limited thereto. Although the present disclosure has been described in detail with reference to the foregoing embodiments, those skilled in the art should understand that they can modify the technical solutions described in the embodiments, or substitute the technical features of the embodiments with equivalents. The modifications and substitutions of the embodiments do not depart from the spirit and scope of the technical solutions of the embodiments of the present disclosure.

What is claimed is:

1. A data processing method, comprising:
   reading first to-be-processed data from a first storage unit into a second storage unit, wherein the first to-be-processed data is at a first layer of one or more image pyramids having a plurality of layers;
   computing a processing result according to the first to-be-processed data stored in the second storage unit; and
   while computing the processing result, reading second to-be-processed data from the first storage unit, wherein the second to-be-processed data is at a second layer of the one or more image pyramids;

wherein:

the one or more image pyramids includes a first image pyramid including a first original pyramid of a first image and a second image pyramid including a second original pyramid of a second image;

the second to-be-processed data includes:

data within a first tracking window at the second layer of the first image pyramid, wherein a position of the first tracking window is determined according to a position of a tracking point at the second layer of the first original pyramid; and data within a second tracking window at the second layer of the second image pyramid, wherein a position of the second tracking window is determined according to the processing result; and the processing result comprises an offset correction of the tracking point at the first layer and a predicted offset at the second layer.

2. The method according to claim 1, wherein computing the processing result comprises:

before completing reading the first to-be-processed data, starting to compute the processing result through a plurality of iteration processes according to at least a portion of the first to-be-processed data stored in the second storage unit.

3. The method according to claim 2, wherein:

the first to-be-processed data comprises data at the first layer that is used in one or more of the plurality of iteration processes; and reading the first to-be-processed data comprises reading the first to-be-processed data with a single reading operation.

4. The method according to claim 3, wherein:

reading the second to-be-processed data from the first storage unit comprises:

reading data at the second layer of the first image pyramid from the first storage unit; and after computing the processing result, reading data at the second layer of the second image pyramid from the first storage unit according to the processing result.

5. The method according to claim 4, wherein computing the processing result further comprises computing the processing result according to gradient data of the first image at the first layer.

6. The method according to claim 5, wherein:

the first image further comprises a gradient pyramid; and reading the first to-be-processed data further comprises reading the gradient data into the second storage unit, the gradient data comprising data at the first layer of the gradient pyramid within the first tracking window.

7. The method according to claim 5, further comprising:

calculating the gradient data of the first image according to data of the first original pyramid within the first tracking window at the first layer stored in the second storage unit.

8. The method according to claim 4, wherein the data within the second tracking window at the second layer of the second image pyramid data comprises data of the second original pyramid at the second layer used in one or more of the plurality of iteration processes.

9. The method according to claim 1, further comprising:

obtaining a positional offset of the tracking point from the first image to the second image according to the offset correction and the predicted offset of the tracking point at a lowest layer.

10. A data processing apparatus, comprising:

a first storage unit and a second storage unit;

a memory storing one or more computer programs; and a processor coupled to the memory and configured to execute the one or more computer programs to:

read first to-be-processed data from the first storage unit into the second storage unit, wherein the first to-be-processed data is at a first layer of one or more image pyramids having a plurality of layers;

compute a processing result according to the first to-be-processed data stored in the second storage unit; and while computing the processing result, read second to-be-processed data from the first storage unit, wherein the second to-be-processed data is at a second layer of the one or more image pyramids;

wherein:

the one or more image pyramids includes a first image pyramid including a first original pyramid of a first image and a second image pyramid including a second original pyramid of a second image;

the second to-be-processed data includes:

data within a first tracking window at the second layer of the first image pyramid, wherein a position of the first tracking window is determined according to a position of a tracking point at the second layer of the first original pyramid; and data within a second tracking window at the second layer of the second image pyramid, wherein a position of the second tracking window is determined according to the processing result; and the processing result comprises an offset correction of the tracking point at the first layer and a predicted offset at the second layer.

11. The data processing apparatus according to claim 10, wherein:

the processor is further configured to execute the one or more computer programs to, before completing reading the first to-be-processed data, start computing the processing result through a plurality of iteration processes according to at least a portion of the first to-be-processed data stored in the second storage unit.

12. The data processing apparatus according to claim 11, wherein:

the first to-be-processed data comprises data at the first layer that is used in one or more of the plurality of iteration processes; and the processor is further configured to execute the one or more computer programs to read the first to-be-processed data with a single reading operation.

13. The data processing apparatus according to claim 12, wherein:

the processor is further configured to execute the one or more computer programs to:

read data at the second layer of the first image pyramid from the first storage unit; and after computing the processing result, read data at the second layer of the second image pyramid from the first storage unit according to the first processing result.

14. The data processing apparatus according to claim 13, wherein the processor is further configured to execute the one or more computer programs to compute the processing result according to gradient data of the first image at the first layer.

15. A non-transitory computer-readable storage medium storing computer program instructions executable by at least one processor to:
    read first to-be-processed data from a first storage unit into a second storage unit, wherein the first to-be-processed data is at a first layer of one or more image pyramids having a plurality of layers;
    compute a processing result according to the first to-be-processed data stored in the second storage unit; and
    while computing the processing result, read second to-be-processed data from the first storage unit, wherein the second to-be-processed data is at a second layer of the one or more image pyramids;
    wherein:
    the one or more image pyramids includes a first image pyramid including a first original pyramid of a first image and a second image pyramid including a second original pyramid of a second image;
    the second to-be-processed data includes:
        data within a first tracking window at the second layer of the first image pyramid, wherein a position of the first tracking window is determined according to a position of a tracking point at the second layer of the first original pyramid; and
        data within a second tracking window at the second layer of the second image pyramid, wherein a position of the second tracking window is determined according to the processing result; and
    the processing result comprises an offset correction of the tracking point at the first layer and a predicted offset at the second layer.

16. The non-transitory computer-readable storage medium according to claim 15, wherein computing the processing result comprises:
    before completing reading the first to-be-processed data, starting computing the processing result through a plurality of iteration processes according to at least a portion of the first to-be-processed data stored in the second storage unit.

17. The non-transitory computer-readable storage medium according to claim 16, wherein:
    the first to-be-processed data comprises data at the first layer that is used in one or more of the plurality of iteration processes; and
    the computer program instructions are executed by the processor to further read the first to-be-processed data with a single reading operation.

* * * * *